(12) United States Patent
Takao et al.

(10) Patent No.: US 6,954,795 B2
(45) Date of Patent: Oct. 11, 2005

(54) TRANSMISSION/RECEPTION SYSTEM AND METHOD FOR DATA BROADCAST, AND TRANSMISSION APPARATUS FOR DATA BROADCAST

(75) Inventors: Naoya Takao, Kadoma (JP); Toshiya Mori, Settsu (JP); Akira Ishikawa, Kashiba (JP); Kakuya Yamamoto, Neyagawa (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 777 days.

(21) Appl. No.: 09/826,640

(22) Filed: Apr. 4, 2001

(65) Prior Publication Data

US 2001/0034787 A1 Oct. 25, 2001

(30) Foreign Application Priority Data

Apr. 5, 2000 (JP) ........................................ 2000-103035

(51) Int. Cl.[7] ........................... G06F 15/73; H04N 7/20; H04N 7/16
(52) U.S. Cl. ....................... 709/231; 709/217; 709/218; 709/223; 725/64; 725/67; 725/115; 725/143; 725/145; 725/146
(58) Field of Search ................................. 709/217, 218, 709/223, 231; 725/64, 67, 114, 115, 143, 144, 145, 146–148, 151

(56) References Cited

U.S. PATENT DOCUMENTS

| | | | | |
|---|---|---|---|---|
| 6,173,317 B1 | * | 1/2001 | Chaddha et al. | ............ 709/219 |
| 6,477,707 B1 | * | 11/2002 | King et al. | ................... 725/97 |
| 6,728,753 B1 | * | 4/2004 | Parasnis et al. | ............. 709/231 |
| 6,782,553 B1 | * | 8/2004 | Ogawa et al. | .............. 725/146 |

FOREIGN PATENT DOCUMENTS

| | | |
|---|---|---|
| EP | 827340 | 3/1998 |
| JP | 10126753 | 5/1998 |

* cited by examiner

*Primary Examiner*—Jeffrey C. Pwu

(57) ABSTRACT

A transmission/reception system for data broadcast comprising: a transmission apparatus transmitting audiovisual stream data for a series of plural programs and plural data broadcasting contents relating to programs, which are multiplexed to each other, and a receiving apparatus receiving the audiovisual stream data and presenting the corresponding program, while superimposing and presenting the data broadcasting content to the audiovisual data. The transmission apparatus starts to transmit the data broadcasting content relating to the program 2, before the time "t0" when audiovisual data should change from the program 1 to 2, and transmits the presentation start instruction message at "t0". While, the receiving apparatus receives the data broadcasting content relating to the program 2, and performs a process for forming an image, and invisibly presents the data broadcasting content. Thereafter, the receiving apparatus changes the state of the data broadcasting content to visible when receiving the presentation start instruction message.

10 Claims, 20 Drawing Sheets fig. 3

SCHEDULE INFORMATION 150

| START TIME | AUDIOVISUAL DATA MANAGING CODE | DATA BROADCASTING CONTENTS MANAGING CODE |
|---|---|---|
| 7:00:00 | AV01 | C01 |
| 7:13:00 | AV02 | C02 |
| 7:15:00 | AV03 | C03 | fig. 4

DATA BROADCASTING CONTENTS SENDING SCHEDULE — 170

| SENDING TIME | DATA BROADCASTING CONTENTS MANAGING CODE |
|---|---|
| 7:00:00~7:12:45 | C01 |
| 7:12:45~7:13:00 | C01,C02 |
| 7:13:00~7:14:45 | C02 |
| 7:14:45~7:15:00 | C02,C03 |
| 7:15:00~7:27:45 | C03 | fig. 5

160 MESSAGE SENDING SCHEDULE

| SENDING TIME (161) | MESSAGE ID (162) |
|---|---|
| 7 : 12 : 45 | 01 |
| 7 : 13 : 00 | 02 |
| 7 : 14 : 45 | 01 |
| 7 : 15 : 00 | 02 | fig. 6

301
DATA BROADCASTING CONTENTC01

```
<head>
<script>
  function func1(){
    LaunchDoc("Co2");
  }
  ...
</script>
<event>
  <item type="EventMessageFired"
      message_id="01"
      onOccur="func1()" />
  ...
</event>
</head>
<body>
  <initial_state "Visible"/>
  ...
</body>
``` fig. 7

302
DATA BROADCASTING CONTENTC02

```
<head>
<script>
  function func2(){
    SetVisibility("Visible");
  }
  ...
</script>
<event>
  <item type="EventMessageFired"
      message_id="02"
      onOccur="func2()" />
  ...
</event>
</head>
<body>
  <initial_state "InVisible"/>
  <form>
  <input type="submit"value="PURCHASE">
  </form>
  ...
</body>
``` fig. 15

1301
DATA BROADCASTING CONTENTC01

```
<head>
<script>
  function func3(){
    LockContentOnMemory("C02");
  }
  function func4(){
    LaunchDoc("C02");
  }
  ...
</script>
<event>
  <item type="EventMessageFired"
      message_id="01"
      onOccur="func3()" />
  <item type="ContentLocked"
      content_id="C02"
      onOccur="func4()" />
  ...
</event>
</head>
<body>
  <initial_state "Visible"/>
  ...
</body>
``` fig. 18

2301
DATA BROADCASTING CONTENTC01

```
<head>
<script>
 function func1(){
   SetVisibility("InVisible");
   LaunchDoc("C02");
 }
 ...
</script>
<event>
  <item type="EventMessageFired"
      message_id="01"
      onOccur="func1()" />
  ...
</event>
</head>
<body>
  <initial_state "Visible"/>
  ...
</body>
``` fig. 20

3301
DATA BROADCASTING CONTENTC01

```
<head>
<script>
  function func1(){
    LaunchDoc("C02");
  }
  ...
</script>
<event>
  <item type="TimerFired"
       timevalue="07:12:45"
       onOccur="func1()" />
  ...
</event>
</head>
<body>
  <initial_state "Visible"/>
  ...
</body>
```

TRANSMISSION/RECEPTION SYSTEM AND METHOD FOR DATA BROADCAST, AND TRANSMISSION APPARATUS FOR DATA BROADCAST

BACKGROUND OF THE INVENTION (1) Field of the Invention

The present invention relates to a transmission and reception system for data broadcast that includes a transmission apparatus for transmitting data broadcasting contents, and a receiving apparatus for receiving the transmitted data broadcasting contents and presenting them to an audience.

(2) Description of the Related Art

In the satellite digital broadcast, which has been put to practical use in recent years, audiovisual data is distributed in the transmission format in conformity with a Moving Picture Experts Group 2 (MPEG2) transport stream specified by the ISO/IEC13818.

Various types of data including audiovisual data can be multiplexed into the MPEG2 transport stream. A data broadcasting system using this MPEG2 is nearing practical use. In this data broadcasting system, MPEG2 transport streams, in which data broadcasting contents relating to audiovisual data, and including characters, graphics, buttons, etc. are superimposed on mainly pictures, are multiplexed and broadcasted.

In a data broadcasting transmission/reception system for transmitting and receiving the data broadcast, a transmission apparatus repeatedly transmits a cluster of data broadcasting contents, while a receiving apparatus receives a data broadcasting content in response to selection by a viewer and presents it to the viewer. Thus, virtual interaction can be realized.

Contents of data broadcast, for example, include a news program as audiovisual data and commentary information relating to the news and the like as data broadcasting contents, or a commercial as audiovisual data and information and the like for enabling an audience to purchase the product in the commercial as data broadcasting contents.

Once a receiving apparatus for data broadcast receives data broadcasting contents and stores them in the internal memory, it performs a series of processes: to access each type of data such as characters and graphics of the data broadcasting contents, perform arithmetic computations on calculation of the two-dimensional coordinates on the display screen for the characters and graphics, expand the data such as characters and graphics in a frame memory for storing images, and output image signals to a display or the like in response to the data in the frame memory by the time when they should be presented.

Normally, it takes more than a few seconds for the receiving apparatus to receive data broadcasting contents and store them in the memory. In addition, after storing the data broadcasting contents in the memory, it takes approximately a few seconds to complete the series of processes required until the two-dimensional coordinates on the screen for character, graphics, and so on are calculated. The time required for the processes varies with the contents of characters, graphics, and so on.

Therefore, it becomes difficult for the transmission apparatus to precisely control the timing when the receiving apparatus presents the data broadcasting contents.

For instance, suppose that audiovisual data to be broadcasted is switched from a news program to a commercial and the transmission apparatus starts to transmit the data broadcasting contents relating to the commercial concurrently with the timing for transmitting audiovisual data for the commercial following the news program. This cause a time lag between the timing when the receiving apparatus starts to present the data broadcasting contents relating to the commercial and the timing when the receiving apparatus starts to present the audiovisual data for the commercial. To cope with this problem, it might be preferred that the transmission apparatus starts to transmit the data broadcasting contents relating to the commercial a bit earlier than the start time for the commercial. However, this is not a feasible solution because it is extremely difficult to determine how earlier the data broadcasting contents should be transmitted than the audiovisual data so that all of them can be presented at the same time.

SUMMARY OF THE INVENTION

In view of the problems as above, an object of the present invention is to provide a transmission and reception system for data broadcast by which a transmission apparatus can accurately control the timing when the receiving apparatus should make the data broadcasting contents visible to an audience. Another object of the invention is to provide a method for transmitting and receiving data used in the transmission and reception system for data broadcast, and a transmission apparatus that makes up the transmission and reception system for data broadcast.

In order to achieve the above-stated objects, the transmission and reception system for data broadcast according to the invention is made up of: the transmission apparatus including: a presentation schedule time obtaining means for obtaining a presentation schedule time when the data broadcasting content is to be presented, a data broadcasting content transmission means for starting to transmit the data broadcasting content before the presentation schedule time, and a message transmission means for transmitting a presentation start instruction message at the presentation schedule time; and the receiving apparatus including: a data broadcasting contents reception and presentation means for receiving the transmitted data broadcasting content and invisibly presenting the data broadcasting content, the invisible presentation of the data broadcasting content meaning a state where a series of processes relating to the presentation prior to a process by which the data broadcasting content becomes visible are performed, and the broadcasting content still remains invisible, and a data broadcasting contents visualization means for visualizing the invisibly presented data broadcasting content, when the transmitted presentation start instruction message is received (Hereafter called System A).

This construction allows the data broadcasting content to be promptly presented visible to an audience at the presentation schedule time, because the receiving apparatus has performed processes relating to the presentation of the data broadcasting to some extent by the presentation schedule time. Therefore, the program producer can accurately specify the time for presenting the data broadcasting content by providing the presentation schedule time for the transmission apparatus.

In addition, in the above system A, the message transmission means transmits an invisible presentation instruction message when the data broadcasting contents transmission means starts to transmit the data broadcasting content, and the data broadcasting contents reception and presentation means starts to receive the transmitted data broadcasting content when the transmitted invisible presentation instruction message is received, and invisibly presents the data broadcasting content when the reception of the data broadcasting content has been completed (Hereafter called System B).

This allows the transmission apparatus to inform the receiving apparatus about the time for starting to receive the data broadcasting content so as to prepare for visibly presenting the data broadcasting content to an audience.

In addition, in the above system B, the data broadcasting contents transmission means starts to transmit a preceding data broadcasting content prior to the data broadcasting content, the preceding data broadcasting content includes first control information including an instruction which instructs the receiving apparatus to, when the invisible presentation instruction message is received, receive the data broadcasting content and designate the data broadcasting content as an object for presentation, the data broadcasting content includes image structure information and second control information, the second information including: (a) an instruction which instructs the receiving apparatus to, when the data broadcasting content becomes the object for presentation, form an image according to the image structure information and keep the image being in an invisible state, and (b) an instruction which instructs the receiving apparatus to, when the presentation start instruction message is received, change the invisible state of the image into a visible state, the data broadcasting contents reception and presentation means receives the preceding data broadcasting content, waits until the invisible presentation instruction message in accordance with the first control information is received, starts to receive the transmitted data broadcasting content when the invisible presentation instruction message is received, designates the data broadcasting content as the object for presentation when the reception of the data broadcasting content has been completed, forms the image in accordance with the second control information in the data broadcasting content as the object for presentation, brings the image to an invisible state, and waits for the presentation start instruction message, and the data broadcasting contents visualization means changes the invisible state of the image into a visible state. (Hereafter called System C)

With this construction, the transmission apparatus instructs the receiving apparatus to invisibly present the data broadcasting content first, and then instructs to change the invisible state of the data broadcasting content to the visible state when the message is received. Thereby, the transmission apparatus can control the receiving apparatus having a so-called browser including script process system so that the data broadcasting content can be visibly presented to an audience just at the estimated time for presentation following the preceding data broadcasting content.

In addition, in the above system C, the data broadcasting contents reception and presentation means performs processes required by the time when the image has been stored in a frame memory in accordance with the image structure information, which is realized by prohibiting signals based on the image in the frame memory from being outputted to a display apparatus connected to the receiving apparatus, relating to the invisible presentation of the data broadcasting content, and the data broadcasting contents visualization means visualizes the data broadcasting content by allowing the signals based on the image in the frame memory to be outputted to the display apparatus connected to the receiving apparatus (Hereafter called System D).

This allows required time for changing the presentation state from invisible to visible to be significantly short. Thus, the data broadcasting content can be visibly presented to an audience just at the estimated time for presentation.

In addition, in the above system D, the preceding data broadcasting content further includes preceding image structure information to form an image as an object for presentation, the instruction in the first control information instructs, when the invisible presentation instruction message is received, to bring the visibly presented image to an invisible state, then start to receive the data broadcasting content, and designate the data broadcasting content as an object for presentation, and the data broadcasting contents reception and presentation means visibly presents the image in accordance with the preceding image structure information after the preceding data broadcasting content is received, and, when the invisible presentation instruction message is received, brings the presented image in accordance with the preceding image structure information to an invisible state, and starts to receive the data broadcasting content.

This prevents the preceding data broadcasting content from remaining visibly presented to an audience even in case that the receiving apparatus cannot receive the data broadcasting content, which is due to be transmitted from the transmission apparatus, owing to the broadcasting trouble or the like.

In addition, in the above system D, the preceding data broadcasting content further includes preceding image structure information in order to form an image as an object for presentation, the data broadcasting contents reception and presentation means: (a) includes a memory which has a space where the data broadcasting content and the preceding data broadcasting content can be stored at the same time, (b) receives the preceding data broadcasting content and stores the content in the memory, and then visibly presents the image in accordance with the preceding image structure information, and (c) when the invisible presentation instruction message is received, starts to receive the data broadcasting content and store the content in the memory, and, when the storage of the content in the memory has been completed, erases the image presented in accordance with the preceding image structure information.

Thereby, there is no need to erase the preceding data broadcasting content so as to free up the memory to be used for processing the data broadcasting content, immediately before the data broadcasting content starts to be received and stored in the memory. Thus, the preceding data broadcasting content can be presented for a longer period time, because the preceding data broadcasting content is erased only after the data broadcasting content has been stored in the memory.

In addition, in the above system C, the data broadcasting contents transmission means further multiplexes video stream data, in which (a) visual data making up a first broadcast program whose content relates to the preceding data broadcasting content and (b) visual data making up a second broadcast program whose content relates to the data broadcasting content are continuously constructed, with the preceding data broadcasting content and the data broadcasting content, and transmits the multiplexed data, the presentation schedule time is determined in advance so as to be concurrent with the time when the receiving apparatus is due to start to present the visual data making up the second broadcast program in the video stream data, and the data broadcasting contents reception and presentation means further receives the transmitted video stream data and presents the broadcast program made up of each of the video stream data.

This allows the receiving apparatus to start the presentation of the data broadcasting content relating to the program 2 precisely concurrent with the timing for switching between the program 1 and program 2, which consist of audiovisual stream data or the like.

In addition, in the above system C, the data broadcasting contents transmission means repeatedly transmits each of the preceding data broadcasting content and the data broadcasting content.

With this construction, even in case that the transmitted data broadcasting content cannot be received at the first time, it can be received at the next time. Therefore, the data broadcasting content can be visibly presented to an audience just at the schedule time for presentation.

In addition, in the above system A, the data broadcast contents reception and presentation means waits for a predetermined time as its opportunity, starts to receive the transmitted data broadcasting content at the time, and, when the reception of the content has been completed, invisibly presents the data broadcasting content.

With this construction, in case that the time for transmitting the data broadcasting content can be specified in advance, the data broadcasting content can be visibly presented to an audience just at the schedule time for presentation.

In addition, in the above system A, the data broadcasting contents reception and presentation means, when an initial state of transmission of the data broadcasting content is detected, starts to receive the transmitted data broadcasting content, and, when the reception of the content has been completed, invisibly presents the data broadcasting content.

This allows the receiving apparatus to detect the initiation of transmission of the data broadcasting content, for example, by referring to the predetermined identification information which are extracted from the received signal and to start to receive the data broadcasting content when the data broadcasting content starts to be transmitted. Thus, the data broadcasting content can be visibly presented to an audience just at the schedule time for presentation.

In addition, a transmission and reception method for data broadcast according to the invention is made up of: a presentation schedule time obtaining step for obtaining a presentation schedule time when the data broadcasting content is to be presented; a data broadcasting contents transmission step for starting to transmit the data broadcasting content before the presentation schedule time by the transmission apparatus; a message transmission step for transmitting a presentation start instruction message at the presentation schedule time by the transmission apparatus; a data broadcasting contents reception and presentation step for receiving the transmitted data broadcasting content and invisibly presenting the data broadcasting content by the receiving apparatus, the invisible presentation of the data broadcasting content meaning a state where a series of processes relating to the presentation prior to a process by which the data broadcasting content becomes visible are performed, and the broadcasting content still remains invisible; and a data broadcasting contents visualization step for, visualizing the invisibly presented data broadcasting content by the receiving apparatus, when the transmitted presentation start instruction message is received.

This construction allows the data broadcasting content to be promptly presented visible to an audience at the schedule time for presentation, because the receiving apparatus has performed processes relating to the presentation of the data broadcasting to some extent by the schedule time.

In addition, a transmission apparatus according to the invention is made up of: a presentation schedule time obtaining means for obtaining a presentation schedule time when the data broadcasting content is to be presented; a data broadcasting contents transmission means for: (a) starting to transmit a preceding data broadcasting content including first control information including an instruction which instructs the receiving apparatus to, when an invisible presentation instruction message is received, start to receive the data broadcasting content and designate the data broadcasting content as an object for presentation, (b) after the start of transmission of the preceding data broadcasting content, and before the presentation schedule time, starting to transmit the data broadcasting content including image structure information in order to an image as an object for presentation and second control information, the second control information includes: (a) an instruction which instructs the receiving apparatus to, when the data broadcasting content becomes the object for interpretation, form the image according to the image structure information and keep the image being in an invisible state, and (b) an instruction which instructs the receiving apparatus to, when the presentation start instruction message is received, change the invisible state of the image into a visible state; and a message transmission means for: (a) transmitting the invisible presentation instruction message when the data broadcasting contents transmission means starts to transmit the data broadcasting content, (b) transmitting the presentation start instruction message at the presentation schedule time.

With this construction, in case that the receiving apparatus has a so-called browser including a script processing system, the data broadcasting content can be visibly presented to an audience just at the schedule time for presentation by controlling the receiving apparatus.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 3 shows a construction and an example of schedule information stored in a schedule information storage unit 101;

FIG. 4 shows a construction and an example of a data broadcasting contents sending schedule determined by a scheduling unit 102;

FIG. 5 shows a construction and an example of a message sending schedule determined by a scheduling unit 102;

FIG. 6 shows an example of control statements in a data broadcasting content C01;

FIG. 7 shows an example of control statements in a data broadcasting content C02 which corresponds to the program next to the data broadcasting content C01;

FIG. 15 shows an example of control statements 1301 in the data broadcasting content C01 transmitted by the transmission apparatus 100 in the second embodiment, which substitutes the control statements 301 in the data broadcasting content C01 shown in the first embodiment;

FIG. 18 shows an example of control statements in a data broadcasting content C01;

FIG. 20 shows an example of control statements in a data broadcasting content C01.

DESCRIPTION OF THE PREFERRED EMBODIMENT

The following describes a transmission and reception system for data broadcast according to a preferred embodiment of the present invention with reference to the drawings.
<Embodiment 1>

Figure 1:
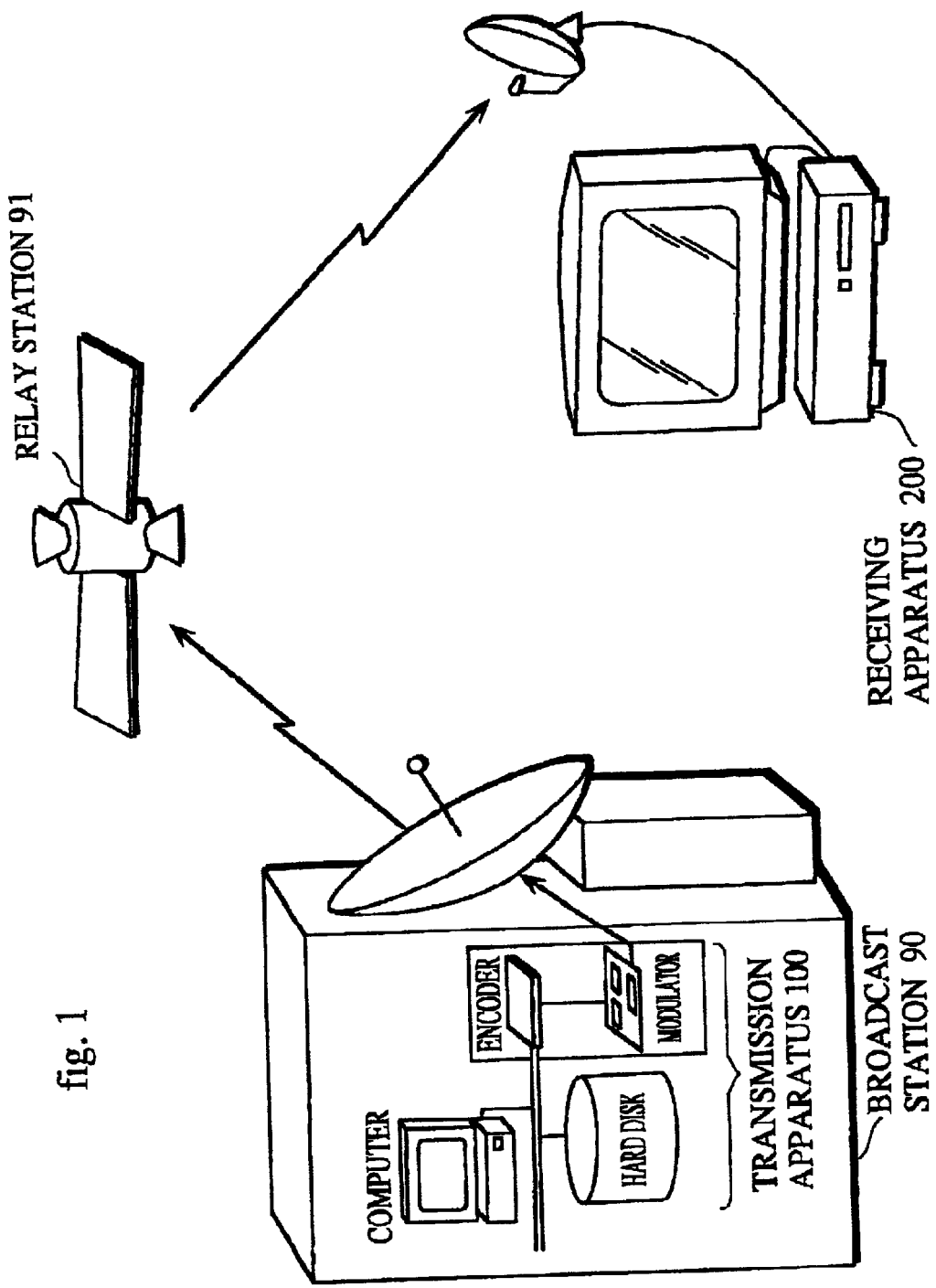
FIG. 1 is an overall construction of a transmission and reception system for data broadcast according to the first embodiment.

FIG. 1 is an overall construction of a transmission and reception system for data broadcast according to the first embodiment.

As shown in FIG. 1, the transmission and reception system for data broadcast basically comprises a broadcast station 90 for transmitting digital broadcast, and a receiving apparatus 200 for receiving the broadcast.

The broadcast station 90 includes a transmission apparatus 100 for sending audiovisual data and data broadcasting contents. The transmission apparatus 100 consists of a computer having a CPU, a memory, and the like, a hard disk apparatus, an encoder, a modulator, and so on. This transmission apparatus functions so as to multiplex audiovisual data and data broadcasting contents and broadcast the multiplexed data by way of a broadcasting antenna installed in the broadcast station 90.

With the stated system, for example, a news program as audiovisual data and commentary information as data broadcasting contents are broadcasted.

The broadcasted audiovisual data and data broadcasting contents are transported to the receiving apparatus by way of a relay station 91 which is a satellite.

The receiving apparatus 200 receives the broadcast wave, superimposes audiovisual data and data broadcasting contents to present the same. This receiving apparatus is normally disposed at home, so it is assumed that there exist a number of receiving apparatuses.

Note that "data broadcasting contents" include visual data such as characters and graphics to be presented to an audience, and audio data such as sound effects, and include also the presentation format for these audiovisual data, and control statements which specify operations to be performed in case that viewer's operation has been accepted. Here, "presentation" means that a display or the like displays images and pictures and a speaker or the like reproduces sounds, and means also that signals are outputted in order to display the images and pictures and to reproduce the sounds. Note that "presentation of data broadcasting contents" means to display visual data such as characters and graphics in the data broadcasting contents, and, if the data broadcasting contents include audio data such as sound effects, to reproduce the audio data, and means also to output signals in order to display the image data and to reproduce the audio data.

As a result, an audience is able to visually and auditorily catch the broadcast with a display apparatus equipped with loudspeakers or the like, which is connected to the receiving apparatus.
<Construction of the Transmission Apparatus>

Figure 2:
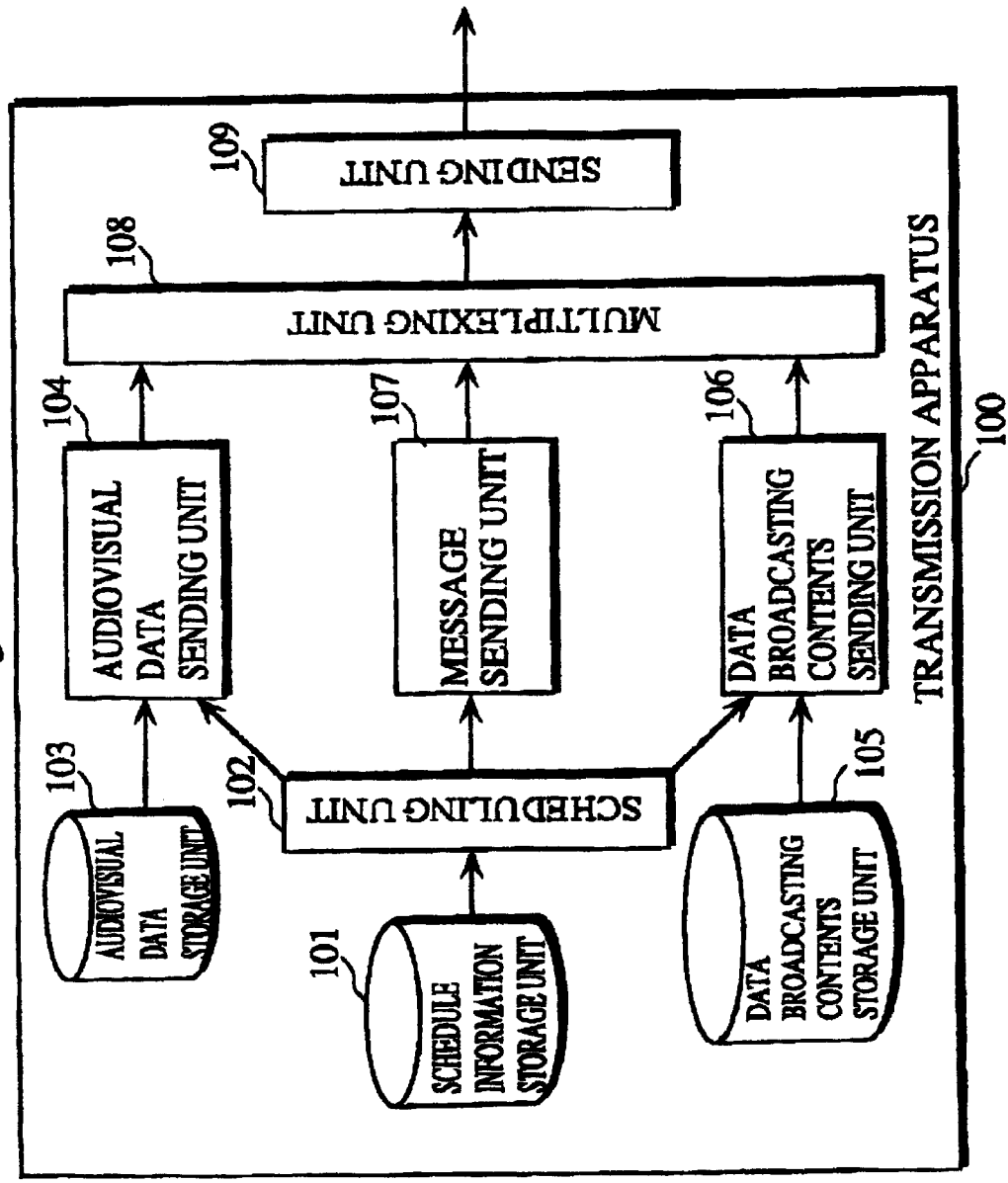
FIG. 2 is a block diagram showing functions of a transmission apparatus 100.

FIG. 2 is a block diagram showing functions of a transmission apparatus 100.

As shown in FIG. 2, the transmission apparatus 100 functionally consists of a schedule information storage unit 101, a scheduling unit 102, an audiovisual data storage unit 103, an audiovisual data sending unit 104, a data broadcasting contents storage unit 105, a data broadcasting contents sending unit 106, a message sending unit 107, a multiplexing unit 106, and a sending unit 109.

The schedule information storage unit 101 is a part of region of storage media such as a memory and a hard disk which stores schedule information indicating the time when each datum of audiovisual data should be presented by the receiving apparatus. Note that "a broadcast program" means a group of audiovisual data and data broadcasting contents, which is intended by the program producer.

The scheduling unit 102 determines schedules for sending each of audiovisual data, messages, and data broadcasting contents in accordance with the schedule information stored in the schedule information storage unit 101, and transmits the schedules to the audiovisual data sending unit 104, the message sending unit 107, and the data broadcasting contents sending unit 106, respectively. Each schedule will be described later in detail.

The audiovisual data storage unit 103 is a part of region of a hard disk, videotape, or the like, in which audiovisual data for each broadcast program produced in advance is stored.

The audiovisual data sending unit 104 reads the audiovisual data, which is stored in the audiovisual data storage unit 103, in accordance with the schedules transmitted from the scheduling unit 102, compression-encodes the data so as to become image stream data and audio stream data, formats the data to an image Packetized Elementary Stream (PES) and an audio PES, which are divided into a packet as one frame, and sends them to the multiplexing unit 108.

The data broadcasting contents storage unit 105 is a part of region of a hard disk, or the like, in which data broadcasting contents for each broadcast program produced in advance is stored.

The data broadcasting contents sending unit 106 reads the data broadcasting contents (i.e., various material data such as characters, graphics, and control statements) which are stored in the data broadcasting contents storage unit 105, in accordance with the schedules transmitted from the scheduling unit 102, formats the contents into the module format for transmission, and repeatedly sends the contents to the multiplexing unit 108.

The message sending unit 107 sends a message to the multiplexing unit 108 in accordance with the schedules transmitted from the scheduling unit 102. The message includes a message ID to identify the message. The data size of this message is considerably smaller than the data broadcasting contents for a broadcast program. Therefore, the message has no sooner broadcasted than the receiving apparatus can complete to receive the message.

The multiplexing unit 108 time-division multiplexes each data transmitted from the audiovisual data sending unit 104, the data broadcasting contents sending unit 106, and the message sending unit 107, converts those data into an MPEG2 transport stream format, which consists of a packet on 188 bytes basis, and transmits the converted data to the sending unit 109. Here, a packet ID (PID) is assigned to each packet corresponding to the content. This technique is described in detail in the documentation for ISO/IEC Standard 13818 (MPEG2 system).

The sending unit 109 performs modulation, suitable for the broadcast, to the MPEG2 transport stream transmitted from the multiplexing unit 108 so as to generate broadcast signals, and outputs the broadcast signals to the broadcasting antenna.

<Schedules for Transmission>

FIG. 3 shows a construction and an example of schedule information stored in the schedule information storage unit 101.

Schedule information 150 is reference information for determining the timing when audiovisual data, data broadcasting contents, and messages relating to each broadcast program should be broadcasted. As shown in FIG. 3, the schedule information 150 provides a start time 151, an audiovisual data managing code 152, and a data broadcasting managing code 153, so that they correspond with each other.

The start time 151 indicates the time when the presentation of a broadcast program, which consists of audiovisual data and data broadcasting contents, should be started so that viewers can recognize the program with the receiving apparatus.

The audiovisual data managing code 152 is for identifying the audiovisual data for each broadcast program, which should start to be presented at the corresponding start time. The data broadcasting contents managing code 153 is for identifying the data broadcasting contents for each broadcast program, which should start to be presented at the corresponding start time.

The example shown in FIG. 3 indicates that audiovisual data AV01 and a data broadcasting content C01 should be presented at the time 7:00:00, audiovisual data AV02 and a data broadcasting content C02 should be presented at the time 7:13:00, and audiovisual data AV03 and a data broadcasting content C03 should be presented at the time 7:15:00.

For instance, the audiovisual data AV01 is a news program, and the data broadcasting content C01 is an image or the like showing commentary information relating to the news, while the audiovisual data AV02 is a commercial for advertising a product, and the data broadcasting content C02 is an image or the like including a user interface enabling viewers to purchase the product presented in the commercial.

FIG. 4 shows a construction and an example of a data broadcasting contents sending schedule determined by a scheduling unit 102.

A data broadcasting contents sending schedule 170 provides the timing when the data broadcasting contents corresponding to each broadcast program should be broadcasted, which is determined by the scheduling unit 102 in accordance with the schedule information.

The data broadcasting contents sending schedule 170, as shown in FIG. 4, provides a sending time 171, and a data broadcasting contents managing code 172, so that they correspond with each other.

The sending time 171 shows a period of time during which a group of data broadcasting contents should be repeatedly sent, which is represented by the start and stop times of the period. The data broadcasting contents managing code 172 is for identifying the data broadcasting contents for each broadcast program, which should be sent at the corresponding sending time.

FIG. 4 shows an example of data broadcasting contents sending schedules which is specified in accordance with the schedule information exemplified in FIG. 3. This example shows that the data broadcasting content C01 is repeatedly broadcasted between the time 7:00:00 and 7:12:45, the data broadcasting contents C01 and C02 are repeatedly broadcasted between the time 7:12:45 and 7:13:00, the data broadcasting content C02 is repeatedly broadcasted between the time 7:13:00 and 7:14:45, the data broadcasting contents C02 and C03 are repeatedly broadcasted between the time 7:14:45 and 7:15:00, and the data broadcasting content C03 is repeatedly broadcasted between the time 7:15:00 and 7:27:45.

Here, a band for repeatedly broadcasting the data broadcasting contents is fixed, so that, in case of broadcasting two data broadcasting contents in a period of time according to the data broadcasting sending schedule, the data broadcasting contents sending unit 106 allots the fixed band to each data broadcasting content.

FIG. 5 shows a construction and an example of a message sending schedule determined by the scheduling unit 102.

The message sending schedule 160, as shown in FIG. 5, provides a sending time 161 and a message ID 162 so that they correspond with each other.

The sending time 161 shows a sending time for a message, and the message ID 162 is for identifying the message which should be sent at the corresponding sending time.

FIG. 5 shows an example of message sending schedules which are determined in accordance with the schedule information exemplified in FIG. 3. This example shows that the message with the message ID 01 is broadcasted at 7:12:45, the message with the message ID 02 is broadcasted at 7:13:00, the message with the message ID 01 is broadcasted at 7:14:45, and the message with the message ID 02 is broadcasted at 7:15:00.

<Control Statements in Data broadcasting Contents<

FIG. 6 shows an example of control statements in the data broadcasting content C01.

FIG. 7 shows an example of control statements in a data broadcasting content C02 which corresponds to the program next to the data broadcasting content C01.

Control statements 301 and 302 consist of data described in a Markup language so as to define the data presented by the data broadcasting contents and actions in response to viewer's operations. After broadcast, they are interpreted by so-called a browser in the receiving apparatus. Note that, in FIG. 6, some data, which are not important for explaining the invention, are omitted.

Portions between "<script>" and "</script>" in the control statements 301 and 302 are command descriptions, i.e., "scripts", which are objects to be interpreted and executed by a script processing processor, such as an interpreter included in the browser in the receiving apparatus.

"LaunchDoc" in the control statements 301 is a command description which commands to define the data broadcasting content designated as its parameter as the object to be interpreted by the browser and to present the data broadcasting content based on the result of the interpretation. In case that the designated data broadcasting content has not been received yet, this command description commands to receive the content first, then interpret it, and present it based on the result of the interpretation. Thus, "LaunchDoc ("C02")" is a command for interpretation of the data broadcasting content C02 and presentation of it based on the result of the interpretation. The "func1" is a function name, which includes the LaunchDoc command as its content. Note that "interpretation of a data broadcasting content" means that control statements in the data broadcasting content are interpreted.

Portions between "<event>" and "</event>" are descriptions which designate event types and functions to be launched at the time of generation of the events with reference to events which become cues for activating functions in the receiving apparatus.

In the control statements 301, "<item type="EventMessageFired" message_id="01" onOccur="func1( )"/>" indicates that a command making up a function having a name "func1" is executed at the time of generation of the event where the message with message ID 01 is received.

Portions between "<body>" and "</body>" in the control statements 301 and 302 are descriptions indicating the data presented by the data broadcasting content and the presentation format. For instance, they include information specifying characters and pictures.

In the control statements 301, "<initial_state "Visible"/>" indicates that an initial state of the presentation of the image in the data broadcasting content is visible.

While, "SetVisibility("Visible");" in the control statements 302 is a command description which commands to change the invisibly presented state of characters, pictures, and the like to the visible state. The "func2" is a function name, which includes the SetVisibility command as its content.

In the control statements 302, "<item type="EventMessageFired" message_id="02" onOccur="func2( )"/>" indicates that a command with a function whose name is "func2" is executed at the time of generation of the event where the message with message ID 02 is received.

In the control statements 302, "<form><input type="submit"value="purchase"></form>" is a description indicating a "purchase" button, for example, in order to accept an input by the viewer who wishes to purchase the product advertised in the commercial. "<initial_state "InVisible"/>" indicates that an initial state of the presentation of the "purchase" button or the like is an invisible state. Here, if the "purchase" button is in a visible state, its color is a recognizable one to the viewer's.

Note that, as for data broadcasting contents including images such as characters and graphics, expressions of "display" and "present" with the attributive expression "invisible", in such as "to display something in an invisible state" or "to present something in an invisible state" means that a series of processing required for displaying the images has not been completed yet, and has not yet reached to the stage where the images are presented so that the viewer's can visually recognize them. Therefore, the images presented in the invisible state means that they are prohibited to be presented so as to be recognizable to the viewer's.

<Operations of Transmission Apparatus>

Figure 8:
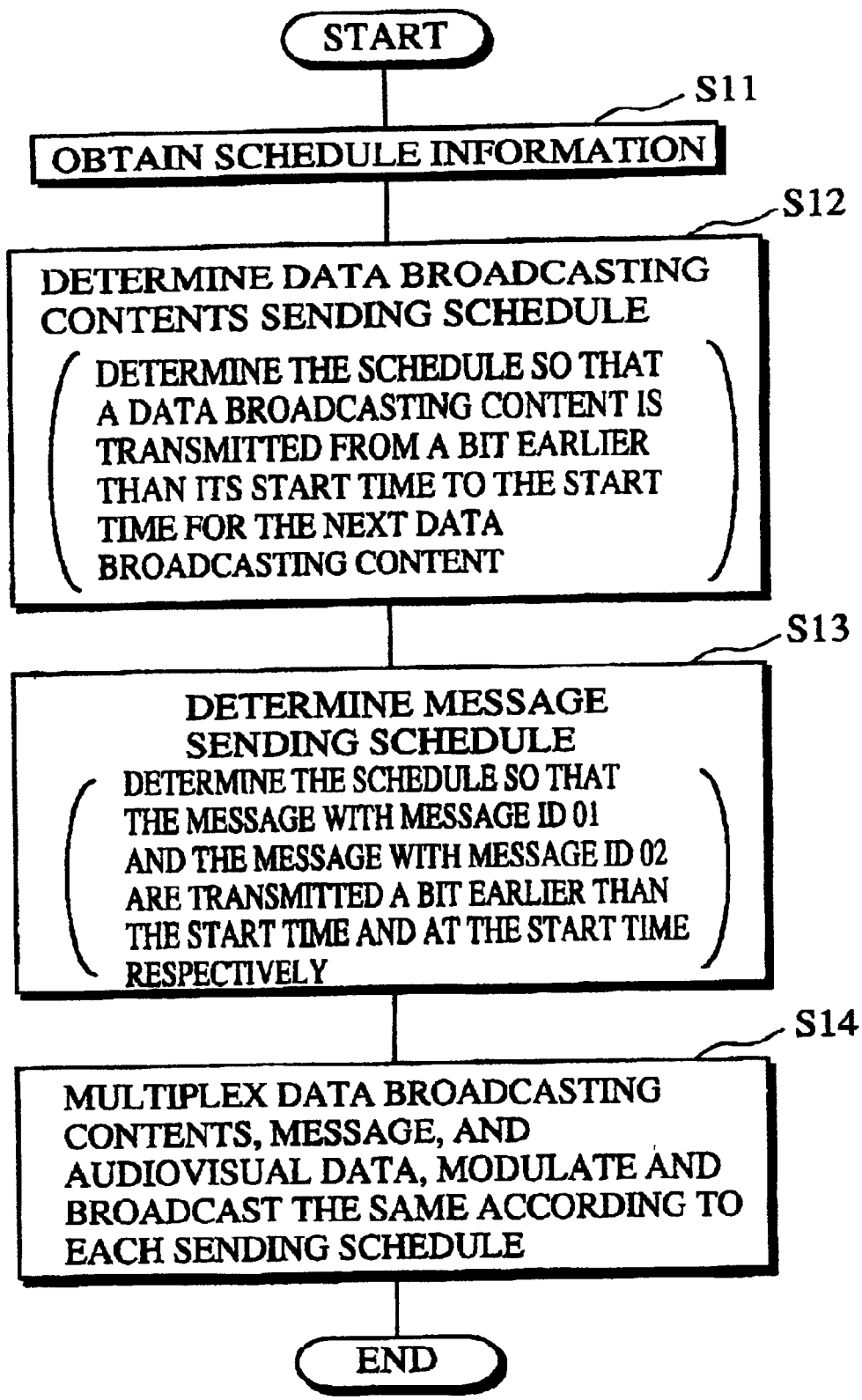
FIG. 8 is a flowchart showing operations of the transmission apparatus.

FIG. 8 is a flowchart showing operations of the transmission apparatus.

The following describes the operations of the transmission apparatus 100 with reference to FIG. 8, provided that schedule information 150 exemplified in FIG. 3 has been stored in the schedule information storage unit 101.

First, the scheduling unit 102 in the transmission apparatus 100 obtains the schedule information stored in the schedule information storage unit 101 (Step S11).

After obtaining the schedule information, the scheduling unit 102 determines the data broadcasting contents sending schedule in accordance with the schedule information (Step S12). More specifically, the scheduling unit 102 designates a time a bit earlier (for example, 15 seconds) than the time specified as the start time for the data broadcasting contents for each broadcast program as the sending start time for the data broadcasting contents, while designating the time specified as the start time for the next broadcast program in the schedule information as the sending stop time. This results in the data broadcasting contents schedule 170 exemplified in FIG. 4.

After determining the data broadcasting contents sending schedule, the scheduling unit 102 determines the message sending schedule in accordance with the schedule information (Step S13). More specifically, the scheduling unit 102 determines a time as the sending time for the message with message ID 01, the time is a bit earlier than the time specified as the start time for the data broadcasting contents for each broadcast program in the schedule information, and is the sending start time of the data broadcasting contents determined in the Step S12, while determining a time as the sending time for the message with message ID 02, the time is specified as the start time for the data broadcasting contents for each broadcast program. This results in the message sending schedule 160 exemplified in FIG. 5.

After determining the message sending schedule, the scheduling unit 102 transmits the schedule that the corresponding audiovisual data is sent at each start time provided in the schedule information 150 to the sending unit 104, transmits the data broadcasting contents sending schedule 170 to the data broadcasting contents sending unit 106, and transmits the message sending schedule to the message sending unit 107. Then, the units 104, 106, and 107, which received schedules, sends audio and visual PES, data broadcasting contents in a module format, and the message to the multiplexing unit 108. The multiplexing unit 108 multiplexes each received data into an MPEG2 transport stream, and transmits them to the sending unit 109. The sending unit 109 performs digital modulation to the transmitted MPEG2 transport stream and outputs them to the broadcasting antenna (Step S14).

Finally, the broadcast signals outputted from the sending unit 109 are broadcasted by way of the broadcasting antenna in the broadcast station 90.

<Construction of Receiving Apparatus>

Figure 9:
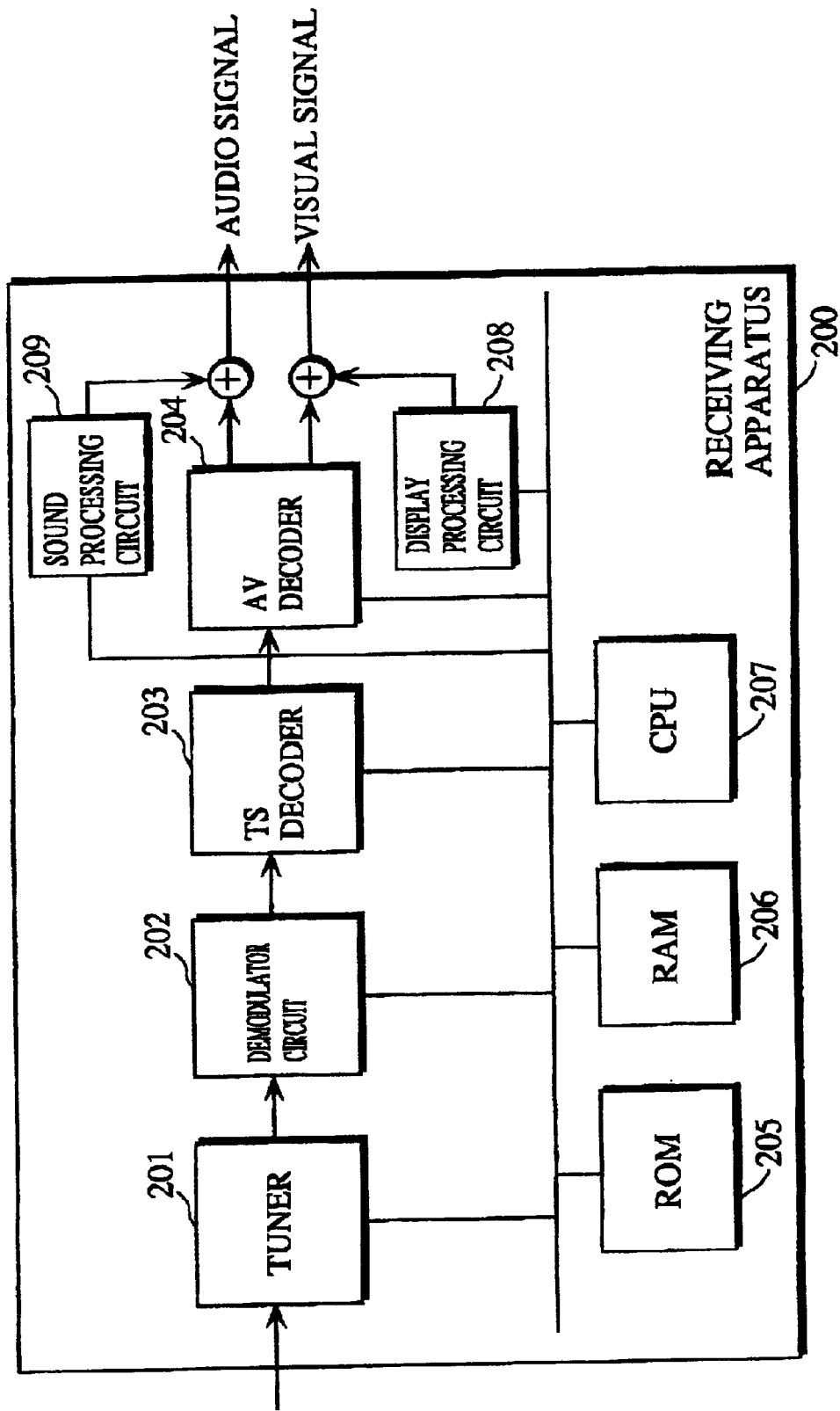
FIG. 9 is a block diagram of a receiving apparatus 200.

FIG. 9 is a block diagram of a receiving apparatus 200. Note that elements which are not important for explaining the invention are omitted.

The receiving apparatus 200 is a so-called "set top box" and comprises a tuner 201, a demodulator circuit 202, a transport (TS) decoder 203, an AV decoder 204, a ROM 205, a RAM 206, a CPU 207, a display processing circuit 208, and a sound processing circuit 209.

The tuner 201 tunes in on a station under the control by the CPU 207 to receive the broadcast signals broadcasted from the broadcast station 90 or the like.

The demodulator circuit 202 demodulates the MPEG2 transport stream, which was subjected to digital modulation and which the tuner 201 received, and transmits it to the TS decoder 203.

The TS decoder 203 separates and extracts the data corresponding to the filter condition specified by the CPU 208 from the MPEG2 transport stream received from the demodulator circuit 202. The filter condition is specified by PID and the like.

The TS decoder 203, more specifically, separates and extracts video stream data and audio stream data from the MPEG2 transport stream and inputs them to the AV decoder 204. Also, if the data broadcasting contents specified with the PID or the like designated by the CPU 207 are received so that the contents can be separated and extracted, then the TS decoder 203 stores them in the RAM 206 and informs the CPU 207 by means of interruption that the storage has been completed. Moreover, if the message specified with the PID, the message ID, and the like designated by the CPU207 are received so that the message can be separated and extracted, the TS decoder 203 informs the CPU 207 about that by means of interruption.

The AV decoder 204 is a so-called MPEG decoder, which decompresses inputted audio stream data and video stream data while synchronizing them with reference to the time stamp assigned to each frame, and outputs the audio and visual signals.

The ROM 205 is a memory which stores control programs to control each part of the receiving apparatus 200, and the CPU207 controls the each part of the receiving apparatus 200 by executing the control programs.

The RAM 206 is a memory which is used for storing data necessary for the CPU 207 to execute the control programs, and which stores the data broadcasting contents separated and extracted by the TS decoder 203.

The display processing circuit 208 assembles "on-screen display graphics (OSD)", that is, images such as characters, and graphics as the objects for presentation in accordance with the instruction from the CPU 207 so that they can be displayed on the screen of the display apparatus.

The sound processing circuit 209, for example, performs data exchange for sounds, such as sound effects, in the data broadcasting contents and outputs them.

Here, the receiving apparatus 200 synthesizes the audio output signals from the AV decoder 204 and the output signals from the sound processing circuit 209 and outputs the synthesized signals, while synthesizing the visual output signals from the AV decoder 204 and the output signals from the display processing circuit 208 and outputs the synthesized signals.

The following describes the mechanism for processing the data broadcasting contents in the receiving apparatus 200 having the above-stated construction, which centers on the functions and sets out them in detail. Explanation of sounds, such as sound effects, will be omitted, but images, such as characters, and graphics will be described.

Figure 10:
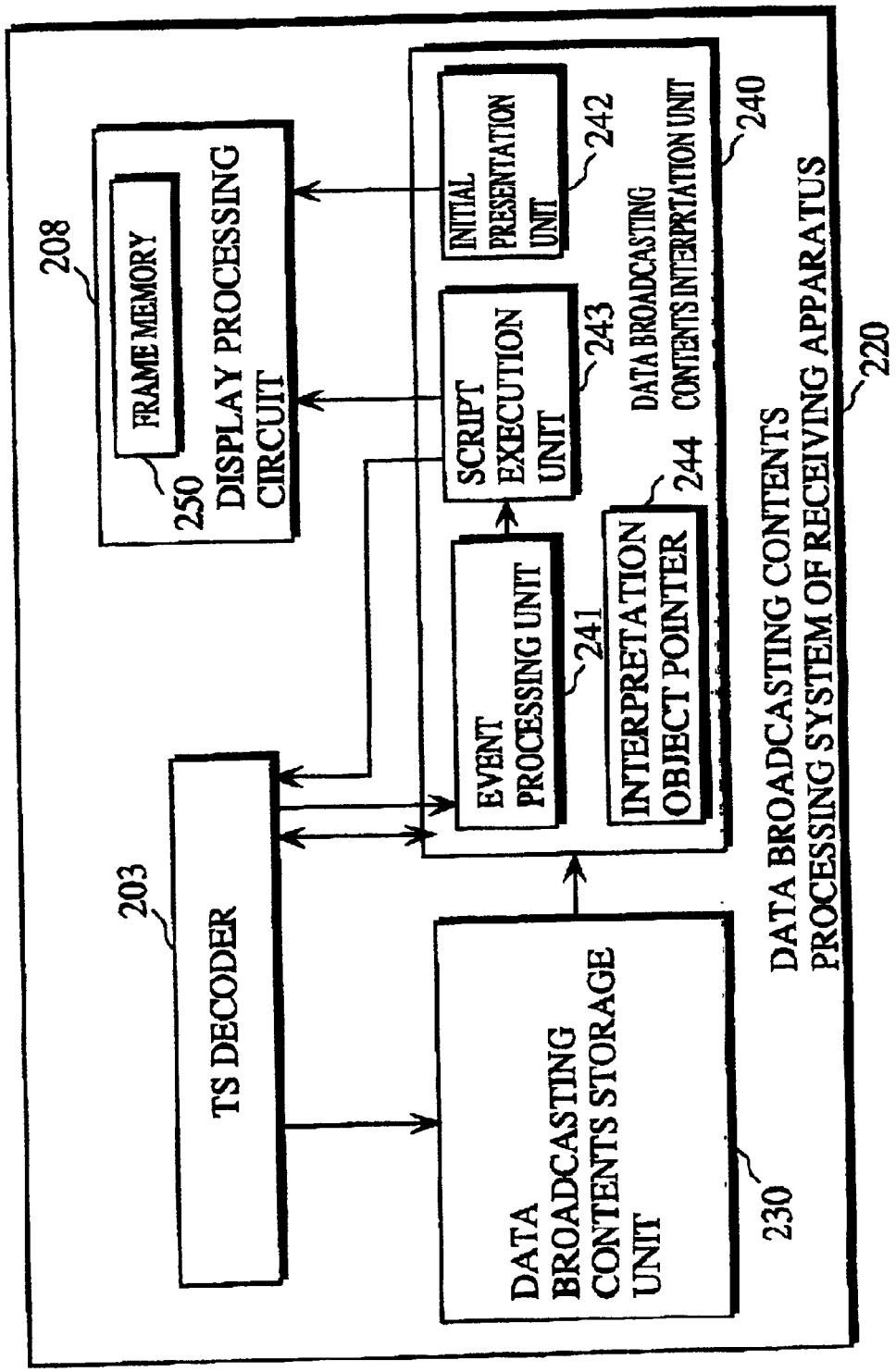
FIG. 10 is a block diagram showing functions of a data broadcasting contents processing system in the receiving apparatus 200.

FIG. 10 is a block diagram showing functions of a data broadcasting contents processing system in the receiving apparatus 200.

The data broadcasting contents processing system 220, as shown in FIG. 10, mainly comprises a TS decoder 203, a display processing circuit 208, a data broadcasting contents storage unit 230, and a data broadcasting contents interpretation unit 240.

The TS decoder 203 and the display processing circuit 208 are mentioned as above.

The display processing circuit 208 has a frame memory 250 to store the assembled images in accordance with the control statements in the data broadcasting contents, and functions so as to unarchive images, such as characters, graphics, and buttons, as display elements onto the frame memory 250, to make the unarchived images visible or invisible, and to clear the unarchived images, in accordance with the instruction from the data broadcasting contents interpretation unit 240. The display processing circuit 208 enables this invisibly presentation state of images by unarchiving the images onto the frame memory 250, and not outputting the image signals to the outside.

Normally, it takes some period of time to unarchive images including graphics onto the frame memory, because a series of processes, such as access to each datum including a graphic, and two-dimensional coordinates calculation in the display screen is required. On the contrary, it is not long before unarchived images are changed from the visible state to the invisible state and vice versa.

The data broadcasting contents storage unit 230 is a part of region in the RAM 206 to store the data broadcasting contents separated and extracted by the TS decoder 203.

The data broadcasting contents interpretation unit 240 comprises a ROM205, a RAM206, and a CPU 207 as its hardware components. The data broadcasting contents interpretation unit 240 functions so as to receive the data broadcasting contents and control the interpretation and presentation of them, which is a so-called browser running on an operating system and including script processing system, and comprises an event processing unit 241, an initial presentation unit 242, a script execution unit 243, and an interpretation object pointer 244. These event processing unit 241, initial presentation unit 242, and script execution unit 243 are operation parts which are realized by executing the control programs stored in the ROM 205 by the CPU 207.

The interpretation object pointer 244 is a memory chunk to store address information of the control statements which are objects for interpretation by the data broadcasting contents interpretation unit 240, among the data broadcasting contents stored in the data broadcasting contents storage unit 230. The event processing unit 241 and the initial presentation unit 242, and the script execution unit 243 perform processes in accordance with the control statements as the objects for interpretation by referring to the interpretation object pointer 244. That is, it can be considered that the data broadcasting contents processing system 220 performs control concerning the user interface in accordance with the control statements specifying the control contents mainly relating to the user interface.

The event processing unit 241 stores the event type and the function so that they correspond with each other according to the descriptions on the event type, which is marked up with the <event> tag, and the function to be launched at the generation of the event, controls various units so as to launch the function at the generation of the event. For instance, if the event type is "EventMessageFired", the event processing unit 241 allows the TS decoder 203 to interrupt the CPU 207 when the message with the message ID has been received, separated, and extracted using the message ID defined by the description of "message_id", and in case of the generation of the interruption, allows the CPU 207 to start the execution of the function with the script execution unit 243, and allows the script execution unit 243 to execute the function in case that the event is actually generated, that is, the message has received, separated, and extracted. Here, the event processing unit 241 also performs control so that the function specified in the control statements can be executed in accordance with the viewer's operations by means of remote-control devices or the like.

The initial presentation unit 242 functions so as to instruct the display processing circuit 208 to present the data in accordance with the initial state (which is either visible or invisible), specified with the description of "initial_state" on the basis of the information for display data, such as characters and graphics, marked up with the <body> tag in the control statements as objects for interpretation. Thereby, the display data, such as characters and graphics, specified on the basis of the descriptions in the control statements are transmitted to the display processing circuit 208, positions in the two-dimensional coordinate system are given to the transmitted display data so that they can be displayed on the screen, and the data are unarchived on the frame memory 250.

The script execution unit 243 is, for example, an interpreter, and functions so as to interpret and execute the function. i.e., the description of one or more command lines marked up with the <script> tag in the control statements as objects for interpretation.

For instance, if the command "LaunchDoc" is interpreted, the script execution unit 243 changes the object for interpretation by setting the address information of the control statements in the data broadcasting contents on the interpretation object pointer 244, this address information is indicated by the parameter of the command such as "C02". Here, if the data broadcasting contents have not been stored in the data broadcasting contents storage unit 230 yet, the script execution unit 243 designates PID or the like in accordance with the parameter, such as "C02", then sets the filter condition or the like on the TS decoder 203 to receive, separate, and extract the data broadcasting contents. Then, if the data broadcasting contents has been received and stored in the data broadcasting contents storage unit 203 by means of the TS decoder 203, the script execution unit 243 promptly changes the object for interpretation.

In addition, for instance, if a command "SetVisibility ("Visible")" is interpreted, the script execution unit 243 instructs the display processing circuit 208 to bring the image in the data broadcasting contents to a visible state, which has been already unarchived by the display processing circuit 208. While, if a command "SetVisibility ("InVisible")" is interpreted, the script execution unit 243 instructs the display processing circuit 208 to bring the image in the data broadcasting contents to an invisible state, which has been already unarchived by the display processing circuit 208.

Here, with the instruction for the visible state, the display processing circuit 208 outputs the signals in accordance with the data broadcasting contents which have been already unarchived, while, with the instruction for the invisible state, the display processing circuit 208 prohibits the signals in accordance with the data broadcasting contents from being outputted.

<Operation of Receiving Apparatus>

The CPU 207 in the receiving apparatus 200 having the above-stated construction, in response to the viewer's operation, receives audiovisual data and data broadcasting contents which make up the broadcast program that the viewer wants to catch, and separates and extracts each data by controlling the tuner 201, the demodulator circuit 202, and the TS decoder 203 by means of electronic program guide (EPG) or the like. Then, the audiovisual data is decompressed with the AV decoder 204, while the data broadcasting contents are processed with the data broadcasting contents processing system. The stream data in the audiovisual data and audiovisual data in the data broadcasting contents are synthesized and outputted.

Figure 11:
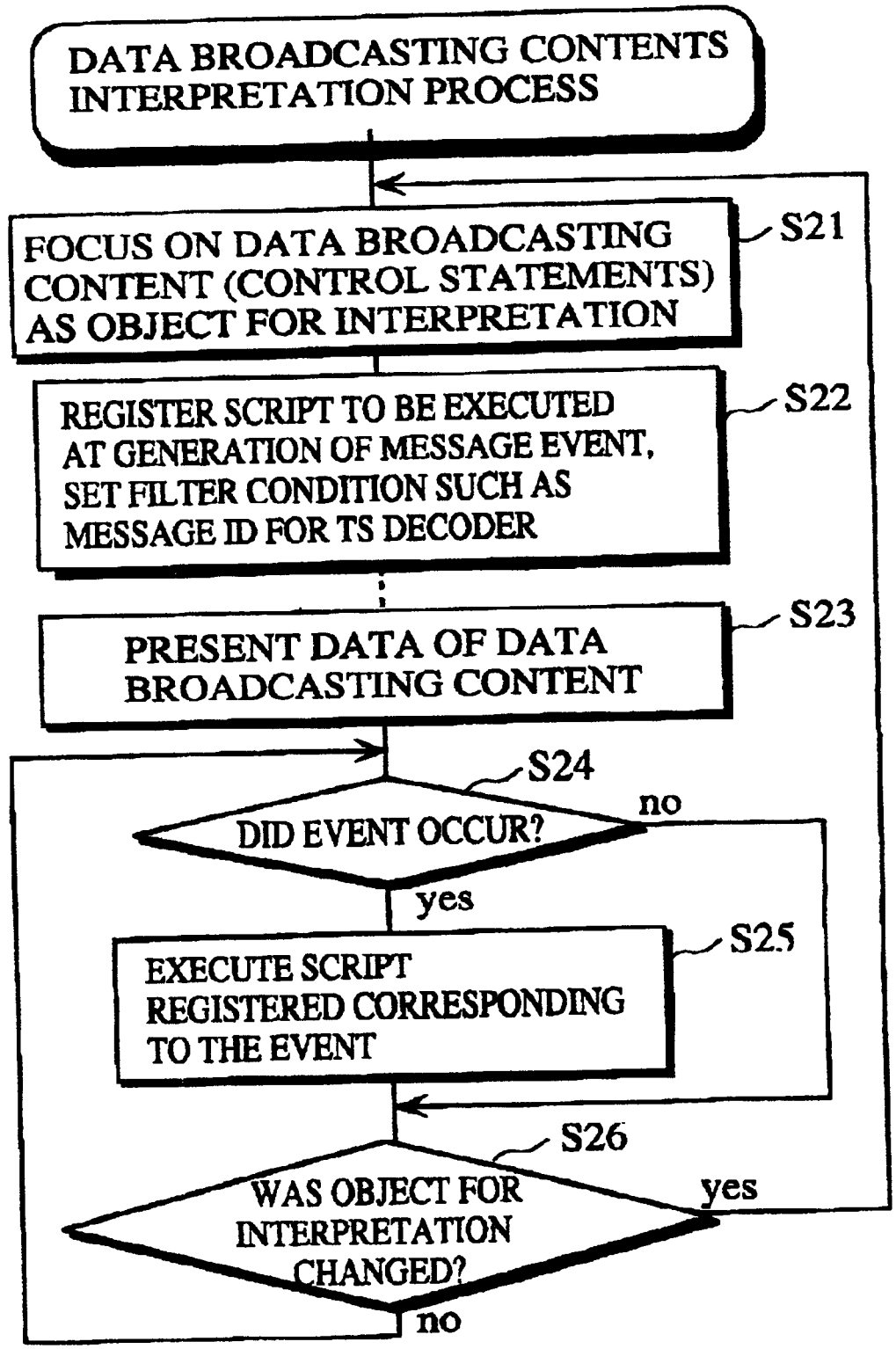
FIG. 11 is a flowchart showing an interpretation processing of data broadcasting contents by the data broadcasting contents processing system 220.

The following describes the interpretation process of the data broadcasting contents by the data broadcasting contents processing system 220, referring to FIG. 11.

FIG. 11 is a flowchart showing an interpretation processing of data broadcasting contents by the data broadcasting contents processing system 220.

First, the data broadcasting contents interpretation unit 240 focuses on the control statements in the data broadcasting contents as the object for interpretation (Step S21). That is, it accesses the control statements in the data broadcasting contents indicated by the interpretation object pointer 244. Here, to begin with, the data broadcasting contents interpretation unit 240 allows the TS decoder 203 to separate and extract the desired data broadcasting contents by the viewer by referring to EPG or the like in accordance with the viewer's operation, and to store them in the data broadcasting contents storage unit 230, and set the address information on the control statements in the data broadcasting contents on the interpretation object pointer 244.

The event processing unit 241 in the data broadcasting contents interpretation unit 240 refers to the description marked up with the <event> tag in the focused control statements in the data broadcasting contents as the object for interpretation, and performs a registration process in advance so as to store the event type and the function so that they correspond with each other and the function is executed at the time of the generation of the event. If the event type is "EventMessageFired", then the event processing unit 241 registers the script indicated by the description "onOccur", (i.e., the function), and allows the TS decoder 203 to interrupt the CPU 207 in case that the message with message ID indicated by the description "message_id" is received, separated, and extracted (Step S22). The event processing unit 241 is set so that, if the other event type and function are designated by the description marked up with the <event> tag, the function is executed at the generation of the event with such an event type.

After performing processes for setting with reference to the event, the initial presentation unit 242 refers to the description marked up with the <body> tag in the control statements in the focused data broadcasting contents as the object for interpretation, and controls the display processing circuit 208 so as to display the display data, such as characters and graphics, in the data broadcasting contents in accordance with the initial state of the presentation, which is either visible or invisible, designated by the description "initial_state" (Step S23).

Next, the event processing unit 241 judges whether the event to which the function is registered in the Step S22 is generated or not. In case of the generation of the event, the event processing unit 241 instructs the script execution unit 243 to execute the function registered corresponding to the event type of the generated event. The instructed script execution unit 243 interprets the command line in the function and executes the same (Step S25). Here, the generation of the event is detected, for example, with interruption into the CPU 207.

In the Step S24, in case of no events generated, the data broadcasting contents processing system 220 judges whether the control statements as the object for interpretation has been changed or not, after execution of the Step S25 (Step S26). If the statements has been changed, the data broadcasting contents processing system 220 returns to the Step S21. While, if the statements has not been changed, the judgement process S24 is conducted by the event processing unit 241.

The following specifically describes the operations of the receiving apparatus 200 in case that the data broadcasting contents are received, which are broadcasted in accordance with the schedules exemplified in FIG. 3. The following description centers on the data broadcasting contents processing system 220.

Figure 12:
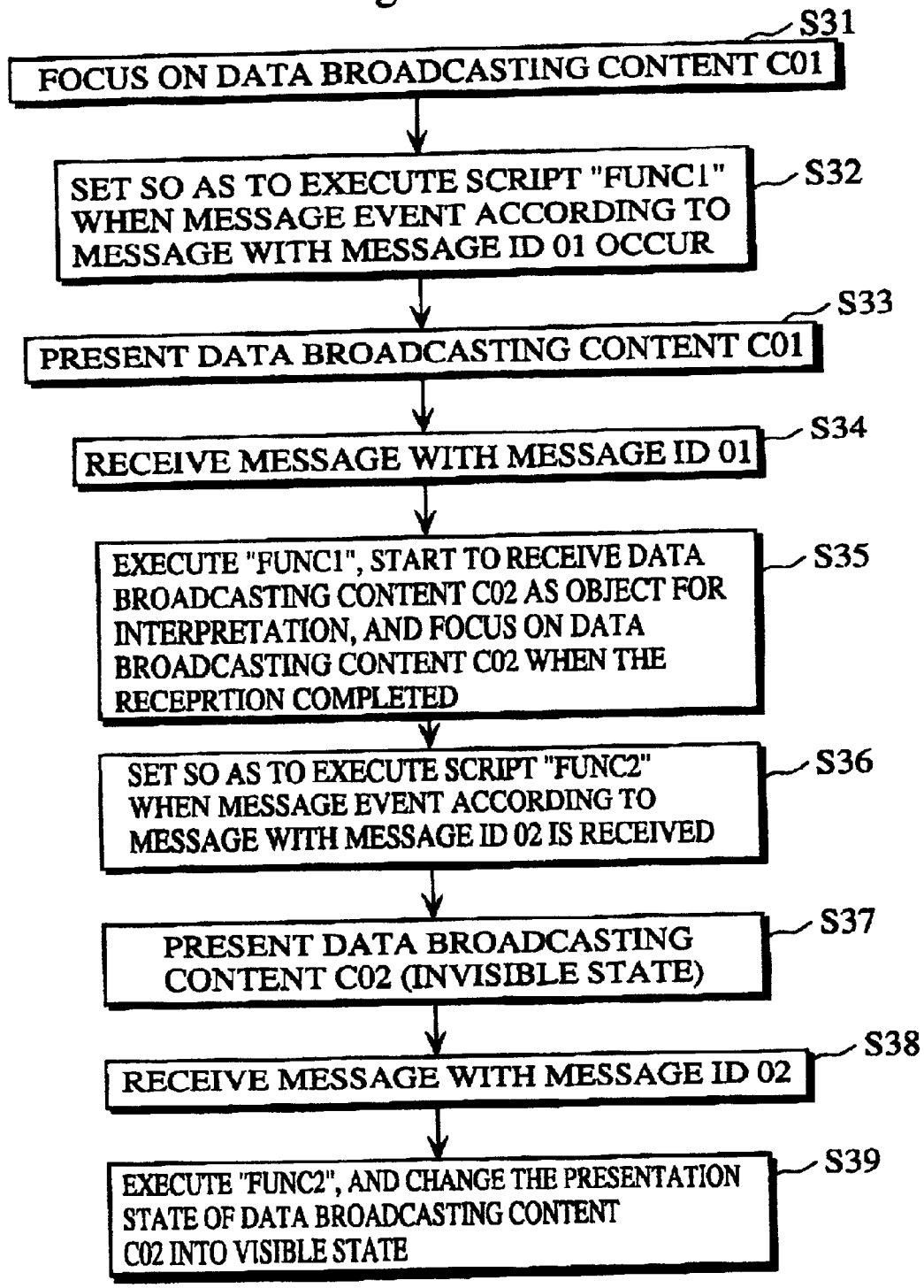
FIG. 12 shows operations of the receiving apparatus 200 when the receiving apparatus receives audiovisual data and data broadcasting contents broadcasted according to the schedule exemplified in FIG. 3, which mainly focuses on the presentation of the data broadcasting contents.

FIG. 12 shows operations of the receiving apparatus 200 when the receiving apparatus receives audiovisual data, and data broadcasting contents broadcasted according to the schedule exemplified in FIG. 3, which mainly focuses on the presentation of the data broadcasting contents.

Note that the following description is on the precondition that the receiving apparatus 200 received the data broadcasting content C01, stores the content in the data broadcasting contents storage unit 230, and the interpretation object pointer 244 indicates the address information on the control statements 301 (See FIG. 6) in the data broadcasting content C01.

First, the data broadcasting contents interpretation unit 240 in the data broadcasting contents processing system 220 focuses on the control statements 301 in the data broadcasting content C01 (Step S31), and sets the interruption processing mechanism or the like for the TS decoder 203 and the operating system so that the function "func1" is executed at the time of the generation of the message event where the message with the message ID 01 is received (Step S32).

Next, the data broadcasting contents interpretation unit 240 makes the initial presentation unit 242 present the data broadcasting content C01 (Step S33). In this case, the initial presentation unit 242 instructs the display processing circuit 208 to visibly present the characters and graphics in accordance with the description marked up with the <body> tag. Thereby, the characters and graphics are unarchived onto the frame memory 250 so as to be positioned on the one or more planes in the visible state. Finally, they are synthesized with the image plane outputted from the AV decoder 204 based on the video stream data, and displayed on the screen.

During the presentation of the data broadcasting content C01, the broadcast station 90 starts to broadcast the data broadcasting content C02 (See FIG. 4) and the message with the message ID 01 is broadcasted at the start time for broadcasting C02 (See FIG. 5). Then, the TS decoder 203 in the receiving apparatus 200 informs the CPU 207 by means of interruption that the message with the message ID 01 has been received (Step S34). As a result, the event processing unit 241 makes the script execution unit 243 execute the function "func1".

Thus, the script execution unit 243 executes "LaunchDoc ("C02")" in the function "func1" (Step S35). That is, the script execution unit 243 excludes the data broadcasting content C01 as the current object for interpretation from the object for interpretation, and sets the filter condition on the TS decoder 203 so that the data broadcasting content C02 starts to be received, separated, and extracted in order to make the data broadcasting content C02 the object for interpretation. When the separated and extracted data broadcasting content C02 has been stored in the data broadcasting content storage unit 230, the script execution unit 243 sets the address information about the control statements 302 (See FIG. 7) in the data broadcasting content C02 on the interpretation object pointer 244 and makes the control statements 302 the object for interpretation. Here, the script execution unit 243 instructs the display processing circuit 208 to stop to display the data broadcasting content at the time when the data broadcasting content is excluded from the object for interpretation. Then, the display processing circuit 208 clears the display data unarchived on the frame memory 250.

On the basis of the control statements 302 as the object for interpretation, the event processing unit 241 sets the interruption processing mechanism or the like on the TS decoder 203 so that the function "func2" is executed at the time of the generation of the message event where the message with the message ID 02 is received (Step S36).

Next, the initial presentation unit 242 performs a process relating to the presentation of the data broadcasting content C02 (Step S37). In this case, the initial presentation unit 242 instructs the display processing circuit 208 to invisibly present the image including the "purchase" button in accordance with the description marked up with the <body> tag. Thereby, the image including the "purchase" button is unarchived onto the frame memory 250 so as to be positioned on the one or more planes in the invisible state. Here, the invisible state corresponds to colorless in terms of the attribute of the color. Since the display processing circuit 208 does not output the image signals so as to be visible to the viewer, the viewer cannot see the content of the data broadcasting content C02 in this state.

While invisibly presenting the data broadcasting content C02, the broadcast station 90 broadcasts the message with the message ID 02 (See FIG. 5). Then, the TS decoder 203 in the receiving apparatus 200 receives the message with the message ID 02 and informs the CPU 207 by means of interruption that the message has been received (Step S38). As a result, the event processing unit 241 makes the script execution unit 243 execute the function "func2".

Thus, the script execution unit 243 executes "SetVisibility ("Visible")" in the function "func2" (Step S39). That is, the script execution unit 243 instructs the display processing circuit 208 so as to change the invisible state of the data broadcasting content C02 to the visible state. Consequently, the image including the "purchase" button is presented in the original color so that the viewer can recognize it. Here, in case that the states of visible and invisible are changed, the operations of the display processing circuit 208 does not include a series of processes required by the time when two-dimensional coordinates for images such as characters and graphics as the display object have been calculated (for example, an access operation to the characters, graphics).

Figure 13:
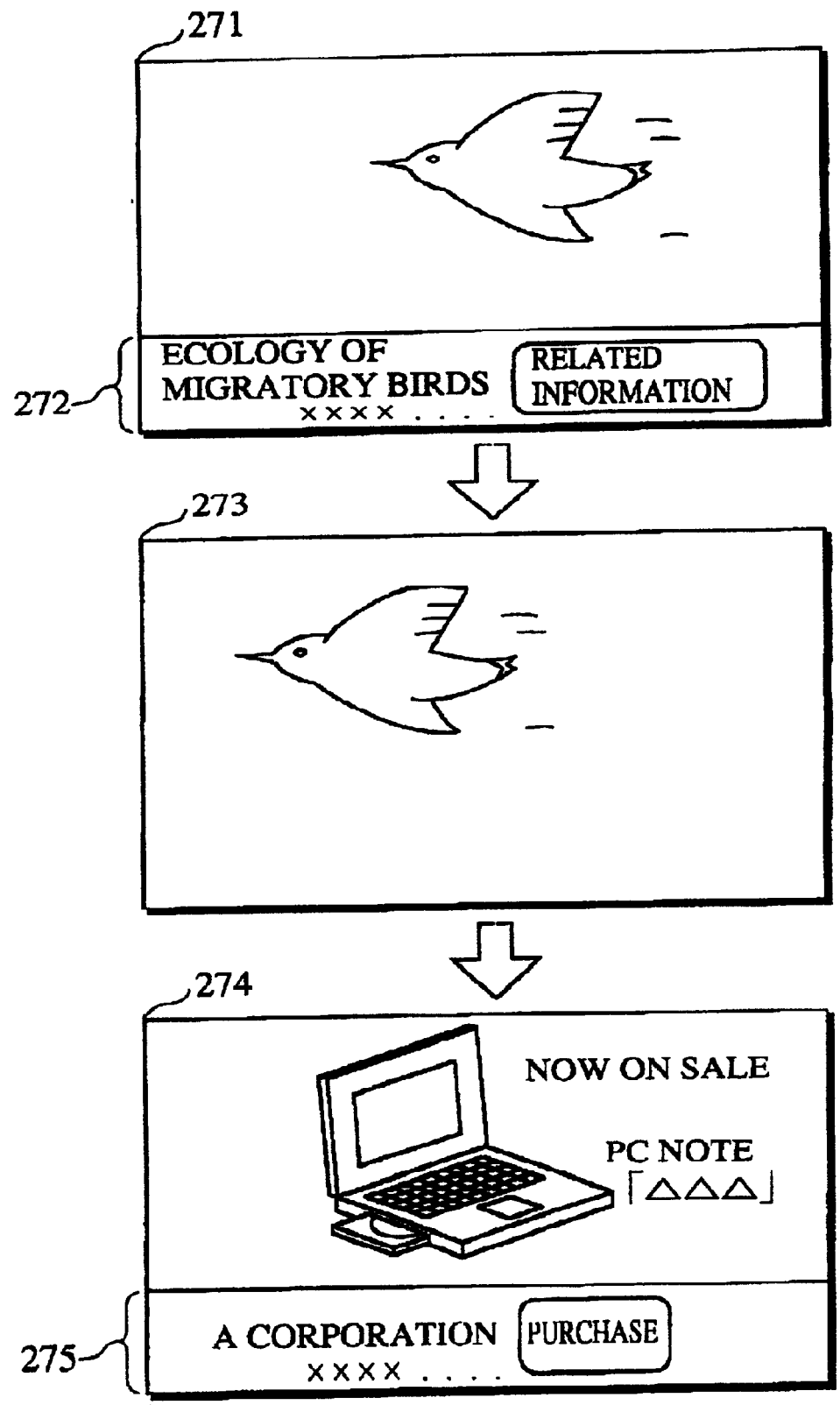
FIG. 13 shows the transition of a display screen connected to the receiving apparatus 200 as a result of the operations shown in FIG. 12.

FIG. 13 shows the transition of a display screen connected to the receiving apparatus 200 as a result of the operations shown in FIG. 12.

A display screen 271 shows a state of one moment during a period of time from the time when the Step S33 is executed to the time when the data broadcasting content C01 is excluded from the object for interpretation in the Step S35. On the display screen, a picture of a news relating to a migratory bird according to the audiovisual data AV01 for a news program is being delivered. Also, an image 272 including characters and graphics which indicates the commentary information relating to the news is presented in front of the picture.

A display screen 273 shows a state of one moment during a period of time from the time when the data broadcasting content C01 is excluded from the object for interpretation in the Step S35 and the data broadcasting content C02 becomes the object for interpretation to the time before the Step S29 is executed. On the display screen, a picture of the news relating to the migratory bird according to the audiovisual data AV01 for a news program is being delivered, but the data broadcasting content is not presented.

A display screen 274 shows a state of one moment after the execution of the Step S39. On the display screen, a picture for advertisement of a personal computer according to the audiovisual data AV02 for a commercial is being delivered, and an image 275 including a "purchase" button which enables the viewer to purchase the product is presented. In case that the viewer selects the "purchase" button on the display screen by means of a remote-control device or the like, the receiving apparatus 200 performs operations, for example, so that the data indicating the purchase is transmitted to the broadcast station 90 or the other apparatuses by telephone line or the like.

<Transmission and Reception Sequence>

The following describes the temporal relationship between the operations of the transmission apparatus 100 and the operations of the receiving apparatus 200, in view of the above-stated operations.

Figure 14:
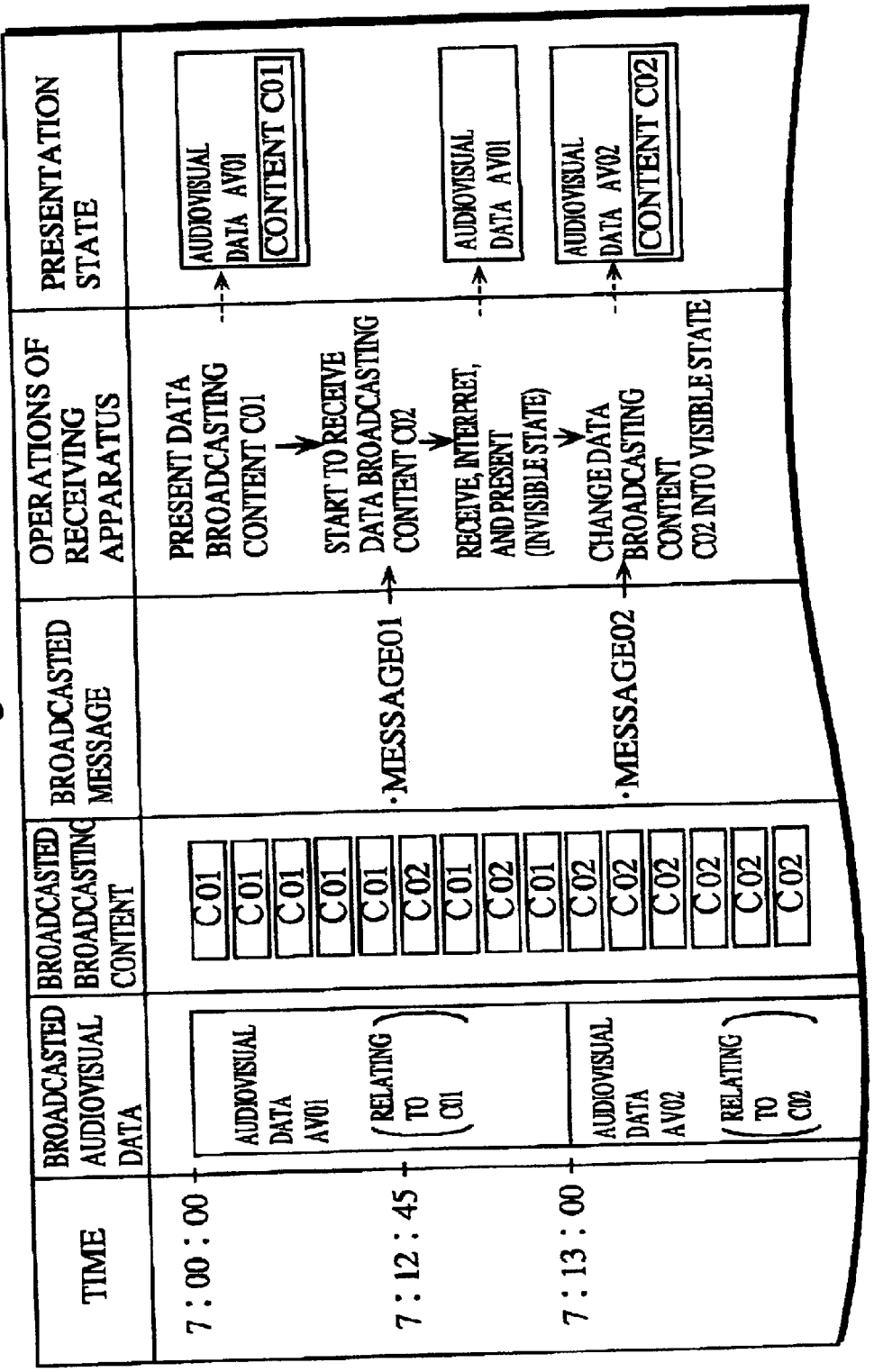
FIG. 14 shows a time chart indicating broadcasted data from the transmission apparatus 100, operations of the receiving apparatus 200, and states of the display screen controlled by the receiving apparatus 200.

FIG. 14 shows a time chart indicating broadcasted data from the transmission apparatus 100, operations of the receiving apparatus 200, and states of the display screen controlled by the receiving apparatus 200.

This is on the precondition that broadcast is performed in accordance with the schedule information 150 exemplified in FIG. 3. Here, the schedule information 150 assumes that the receiving apparatus starts to present the data broadcasting content C02 at the time when the audiovisual data to be received and presented is changed from the audiovisual data AV01 to the audiovisual data AV02.

As for the broadcast of the audiovisual data, the transmission apparatus 100 broadcasts the audiovisual data relating to the data broadcasting content C01 before 7:13:00, and changes to the audiovisual data relating to the data broadcasting content C02 at 7:13:00 to broadcast the audiovisual data AV02.

Meanwhile, as for the broadcast of the data broadcasting contents, the transmission apparatus 100 repeatedly broadcasts the data broadcasting content C01 before 7:12:45 (a bit earlier than 7:13:00), and starts to repeatedly broadcast the data broadcasting content C02 as well at 7:12:45, and stops to broadcast the data broadcasting content C01 at 7:13:00 so that only the data broadcasting content C02 is repeatedly broadcasted.

Meanwhile, as for the broadcast of the message, the transmission apparatus 100 broadcasts the message with the message ID 01 at 7:12:45 when the data broadcasting content C02 starts to be broadcasted, and broadcasts the message with the message ID 02 at 7:13:00.

The receiving apparatus, before 7:12:45, presents the data broadcasting content C01 superimposed to the audiovisual data AV01 so that the viewer can recognize it.

In accordance with the description designating the activation of the function with the generation of the event, such as the description marked up with the <event> tag in the control statements in the data broadcasting content C01, the receiving apparatus starts to receive the following data broadcasting content C02 when the message with the message ID 01 has been received. When the reception has been completed, the receiving apparatus excludes the former data broadcasting content C01 from the object for interpretation so as not to be presented in order to start to interpret the data broadcasting content C02, and invisibly presents the data broadcasting content C02. Therefore, only the audiovisual data AV01 is presented so that the viewer can recognize it.

In accordance with the description designating the activation of the function with the generation of the event in the control statements in the data broadcasting content C02, the receiving apparatus changes the presentation state of the data broadcasting content to the visible state when the message with the message ID 02 has been received. A volume of the message data is so small that its reception can be completed in a considerably short time after the broadcast, and the display processing circuit can change the invisible state of the data broadcasting content to the visible state in a considerably short time. Therefore, the message with the message ID 02 has no sooner broadcasted, (i.e., at 7:13:00) than the audiovisual data AV02 and the data broadcasting content C02 are superimposed and presented so that the viewer can recognize it.

Therefore, with the above-stated procedures by means of the transmitting and receiving apparatuses, the data broadcasting content corresponding to the following broadcast program can be presented so that the viewer can recognize it, precisely concurrent with the timing when the audiovisual data changes to the data corresponding to the following broadcast program.

<Embodiment 2>

The following describes the transmission and reception system for data broadcast according to the embodiment 2 in the present invention. The transmission and reception system for data broadcast of the embodiment 2 is basically the same as the transmission and reception system according to the embodiment 1 as above, except that the contents of the control statements in the data broadcasting contents which are transmitted by the transmission apparatus and operations of the receiving apparatus associated with the contents are different.

Note that the components which are basically the same as in the embodiment 1 are shown using the same reference numerals as in the embodiment 1.

<Control Statements in the Data Broadcasting Content>

FIG. 15 shows an example of control statements 1301 in the data broadcasting content C01 transmitted by the transmission apparatus 100 in the second embodiment, which substitutes the control statements 301 in the data broadcasting content C01 shown in the first embodiment.

"LockContentOnMemory" in the control statements 1301 is a command description which commands to receive, separate, and extract the data broadcasting content designated as the parameter, and store it in the data broadcasting content storage unit 230. Therefore, "LockContentOnMemory("C02")" indicates to receive, separate, and extract the data broadcasting content C02 and store it in the data broadcasting content storage unit 230.

Also, "func3" is a name of the function including the "LockContentOnMemory" command as the content, while "func4" is a name of the function including the "LaunchDoc" command as its content.

In the control statements 1301, "<item type= "EventMessageFired"message_id="01"onOccur="func3( )"/>" indicates that a command which makes up the function having a function name "func3" is executed at the time of generation of the event where the message with message ID 01 is received.

In the control statements 1301, "<item type= "ContentLocked"content_id="C02"onOccur="func4( )"/>" indicates that a command which makes up a function having a function name "func4" is executed at the time of the generation of the event where the data broadcasting content C02 has been stored in the data broadcasting content storage unit 230.

Note that, among the descriptions in the control statements 1301, the same descriptions as in the control statements 301 according to the embodiment 1 have the same meaning explained in the embodiment 1.

<Receiving Apparatus>

The interpretation process of the data broadcasting content by the data broadcasting contents processing system 220 is in the same manner as shown in FIG. 11.

However, the event processing unit 241 in the data broadcasting contents interpretation unit 240 in the receiving apparatus 200 refers to the descriptions marked up with the <event> tag in the control statements. For instance, if the event type is "ContentLocked", the event processing unit 241 functions so as to make the script execution unit 243 execute the function specified by the description "onOccur" at the time when the data broadcasting content specified by the description "content_id" has been stored in the data broadcasting contents storage unit 230, more specifically when the storage has been completed.

In addition, if a command "LockContenOnMemory" is interpreted, the script execution unit 243 functions so as to designate PID or the like in accordance with "C02" or the like, which is a parameter for the command, and set the filter condition for the TS decoder 203 in order to receive, separate, and extract the data broadcasting content designated by the parameter.

Figure 16:
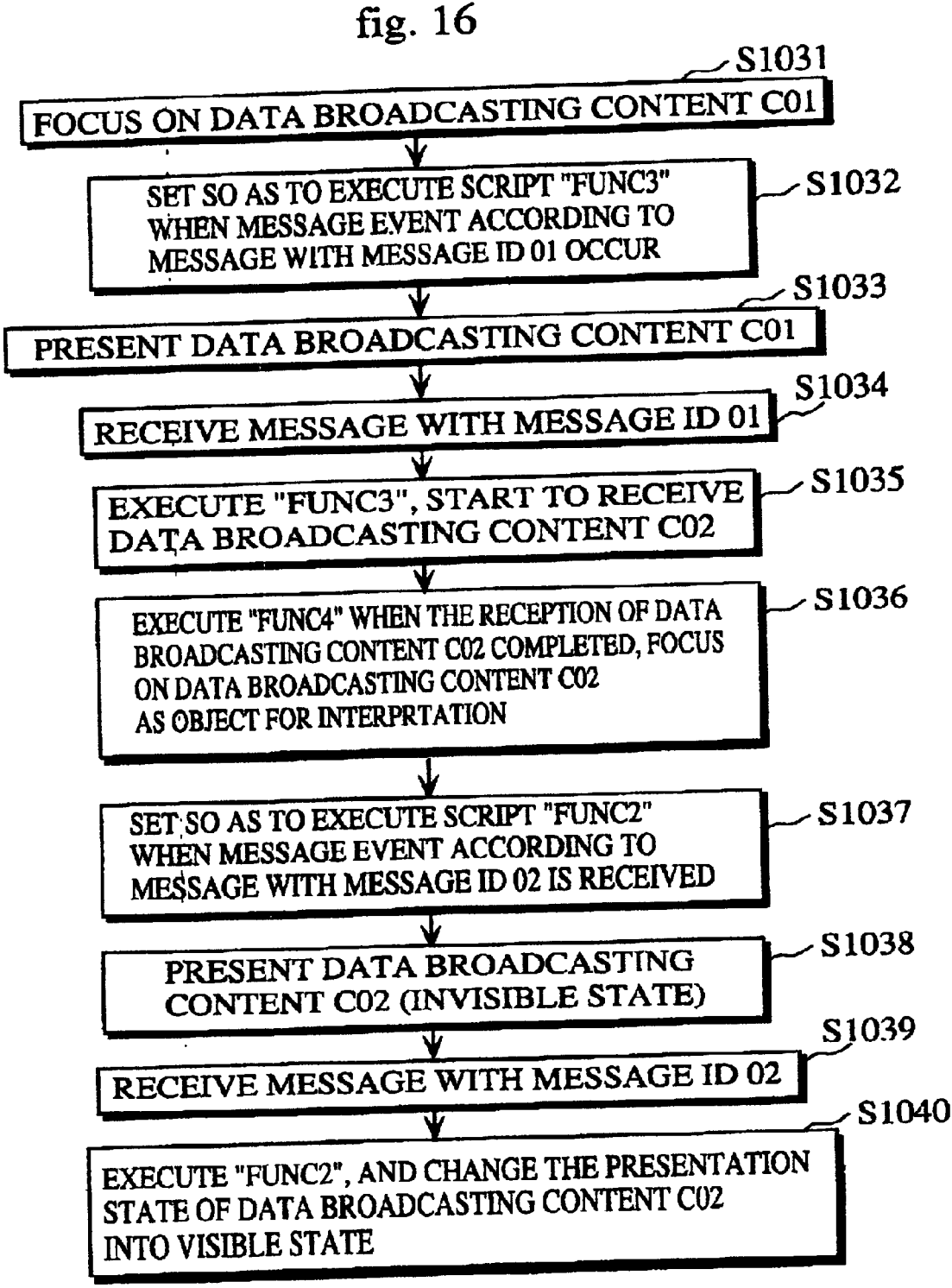
FIG. 16 shows operations of the receiving apparatus 200 in the second embodiment when the receiving apparatus receives audiovisual data and data broadcasting contents broadcasted in accordance with the schedule exemplified in FIG. 3, which mainly focuses on the presentation of the data broadcasting contents.

FIG. 16 shows operations of the receiving apparatus 200 in the second embodiment when the receiving apparatus receives audiovisual data, and data broadcasting contents broadcasted in accordance with the schedule exemplified in FIG. 3, which mainly focuses on the presentation of the data broadcasting contents.

Note that the following description is on the precondition that the receiving apparatus 200 received the data broadcasting content C01, stores the content in the data broadcasting contents storage unit 230, and the interpretation object pointer 244 indicates the address information on the control statements 1301 (See FIG. 15) in the data broadcasting content C01.

First, the data broadcasting contents interpretation unit 240 in the data broadcasting contents processing system 220 focuses on the control statements 1301 in the data broadcasting content C01 (Step S1031), sets the interruption processing mechanism or the like for the TS decoder 203 and the operating system so that the function "func3" is executed at the time of the generation of the message event where the message with the message ID 01 is received, and sets the required data for executing the function "func4" after the data broadcasting content C02 has been stored in the data broadcasting contents storage unit 230 (Step S1032).

Next, the data broadcasting contents interpretation unit 240 makes the initial presentation unit 242 present the data broadcasting content C01 (Step S1033). In this case, the initial presentation unit 242 instructs the display processing circuit 208 to visibly present the characters and graphics in accordance with the description marked up with the <body> tag. Thereby, the characters and graphics are unarchived onto the frame memory 250 so as to be positioned on the one or more planes in the visible state. Finally, they are synthesized with the image plane including pictures outputted from the AV decoder 204 based on the video stream data, and displayed on the screen.

During the presentation of the data broadcasting content C01, the broadcast station 90 starts to broadcast the data broadcasting content C02 (See FIG. 4) and the message with the message ID 01 is broadcasted at the start of the broadcast (See FIG. 5). Then, the TS decoder 203 in the receiving apparatus 200 informs the CPU 207 by means of interruption that the message with the message ID 01 has been received (Step S1034). As a result, the event processing unit 241 makes the script execution unit 243 execute the function "func3".

Thus, the script execution unit 243 executes "Lock ContentOnMemory("C02")" in the function "func3" (Step S1035). That is, the script execution unit 243 sets the filter condition for the TS decoder 203 in order to obtain the data broadcasting content C02, so that the data broadcasting content C02 starts to be received, separated, and extracted. Note that, in this embodiment, the control statements in the data broadcasting content C01 still remains the object for interpretation, and the data broadcasting content C01 is presented on the screen.

After the data broadcasting content C02 has been received, separated, and extracted, and it has been stored in the data broadcasting content storage unit 230, the event processing unit 241 allows the script execution unit 243 to execute the function "func4". Thereby, the script execution unit 243 executes "LaunchDoc("C02")" in the function "func4". That is, the script execution unit 243 sets the address information about the control statements 302 (See FIG. 7) in the data broadcasting contents C02 on the interpretation object pointer 244 and makes the control statements 302 the object for interpretation (Step S1036).

On the basis of the control statements 302 as the object for interpretation, the event processing unit 241 sets the interruption processing mechanism or the like for the TS decoder 203 so that the function "func2" is executed at the time of the generation of the message event where the message with the message ID 02 is received (Step S1037).

Next, the initial presentation unit 242 performs a process relating to the presentation of the data broadcasting content C02 (Step S1038). In this case, the initial presentation unit 242 instructs the display processing circuit 208 to invisibly present the image including the "purchase" button in accordance with the description marked up with the <body> tag. Thereby, the image including the "purchase" button is unarchived onto the frame memory 250 so as to be positioned on the one or more planes in the invisible state. Here, the viewer cannot see the contents of the data broadcasting content C02, which are in the invisible state.

While invisibly presenting the data broadcasting content C02, the broadcast station 90 broadcasts the message with the message ID 02 (See FIG. 5). Then, the TS decoder 203 in the receiving apparatus 200 receives the message with the message ID 02 and informs the CPU 207 by means of interruption that the message has been received (Step S1039). As a result, the event processing unit 241 makes the script execution unit 243 execute the function "func2".

Thus, the script execution unit 243 executes "SetVisibility ("Visible")" in the function "func2" (Step S1040). That is, the script execution unit 243 instructs the display processing circuit 208 so as to change the invisible state of the data broadcasting content C02 to the visible state. Consequently, the image including the "purchase" button is presented in the original color so that the viewer can recognize it.

<Transmission and Reception Sequence>

Figure 17:
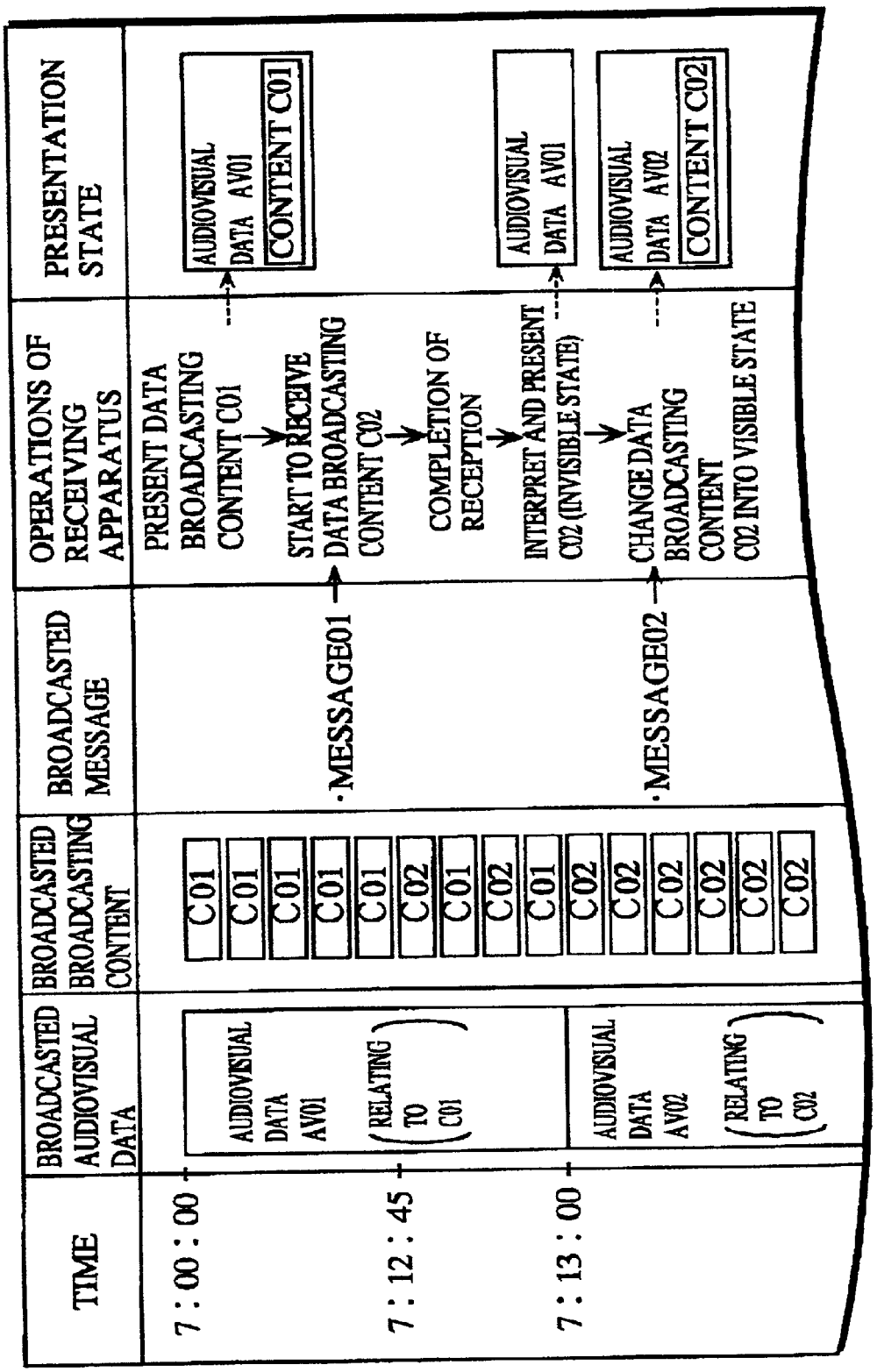
FIG. 17 shows a time chart indicating broadcasted data from the transmission apparatus 100, operations of the receiving apparatus 200, and states of the display screen controlled by the receiving apparatus 200.

FIG. 17 shows a time chart indicating broadcasted data from the transmission apparatus 100, operations of the receiving apparatus 200, and states of the display screen controlled by the receiving apparatus 200.

This is different from FIG. 14 according to the first embodiment in that the data broadcasting content C01 is superimposed to the AV01 and is visibly presented until the reception of the data broadcasting content C02 has been completed. Therefore, in the second embodiment, a period of the time when there is no visible presented data broadcasting content decreases by the time required for receiving the data content C02, as compared to the first embodiment.

<Supplementary Explanations>

As stated above, the transmission and reception system for data broadcast according to the invention has been described with reference to the first and second embodiments. Naturally, the invention is not limited to those embodiments. That is, (1) Both embodiments shows examples where the schedule information 150 (See FIG. 3) indicates the start time for the plurality of broadcast programs, which will be broadcasted in the future. However, in case that the program producer flexibly determines the start time for the following program, the information schedule flexibly determined may be inputted to the schedule information storage unit 101 in the transmission apparatus 100. This can correspond to the case in which the timing for changing the programs is determined immediately before the start time. For example, this occurs when, in a live program, the producer designates the timing for changing from the program to the commercial immediately before the timing.

(2) The first embodiment shows an example in which only the command "LaunchDoc" is provided in the function "func1" in the control statements 301 (See FIG. 6). However, the statements may include the command description "SetVisibility("InVisible") before the command "LaunchDoc" in the function "func1" in order to make the data broadcasting content C01 invisible. FIG. 18 shows the control statements 2301 modified in the manner. In case that the control statements 2301 is broadcasted in place of the control statements 301, the receiving apparatus 200 executes the function "func1" when receiving the message with the message ID 01. That is, after the data broadcasting content C01 is changed to the invisible state, the data broadcasting content C02 starts to be received and interpreted. This prevents the mismatch state of the program where the data broadcasting content C01 is endlessly presented in the visible state and superimposed to the audiovisual data AV02 when the data broadcasting content C02 cannot be received due to broadcasting troubles and the like.

Similarly, "SetVisibility("InVisible")" may be described before the command "LockContentOnMemory" in the function "func3" in the control statements 1301 (See FIG. 15) in the second embodiment.

(3) In both embodiments, the data broadcasting contents interpretation unit 240 performs processes relating to the presentation of the data broadcasting contents (Step S23) after performing a process for storing the function to be executed at the generation of the event, that is for registering the event (Step S22). However, this order may be reversed. In addition, it may be constructed so that, as for the events generated according to the viewer's operation, the function corresponding to the event is not executed unless the data broadcasting content is visibly presented, even after the event has been registered.

(4) In both embodiments, the display data in the data broadcasting content is unarchived so as to be positioned in one or more planes in the frame memory 250 in the display processing circuit 208 in accordance with control statements. However, a frame memory 250 may have two pairs of areas made up of one or more image planes so that the display data is unarchived in accordance with control statements.

Figure 19:
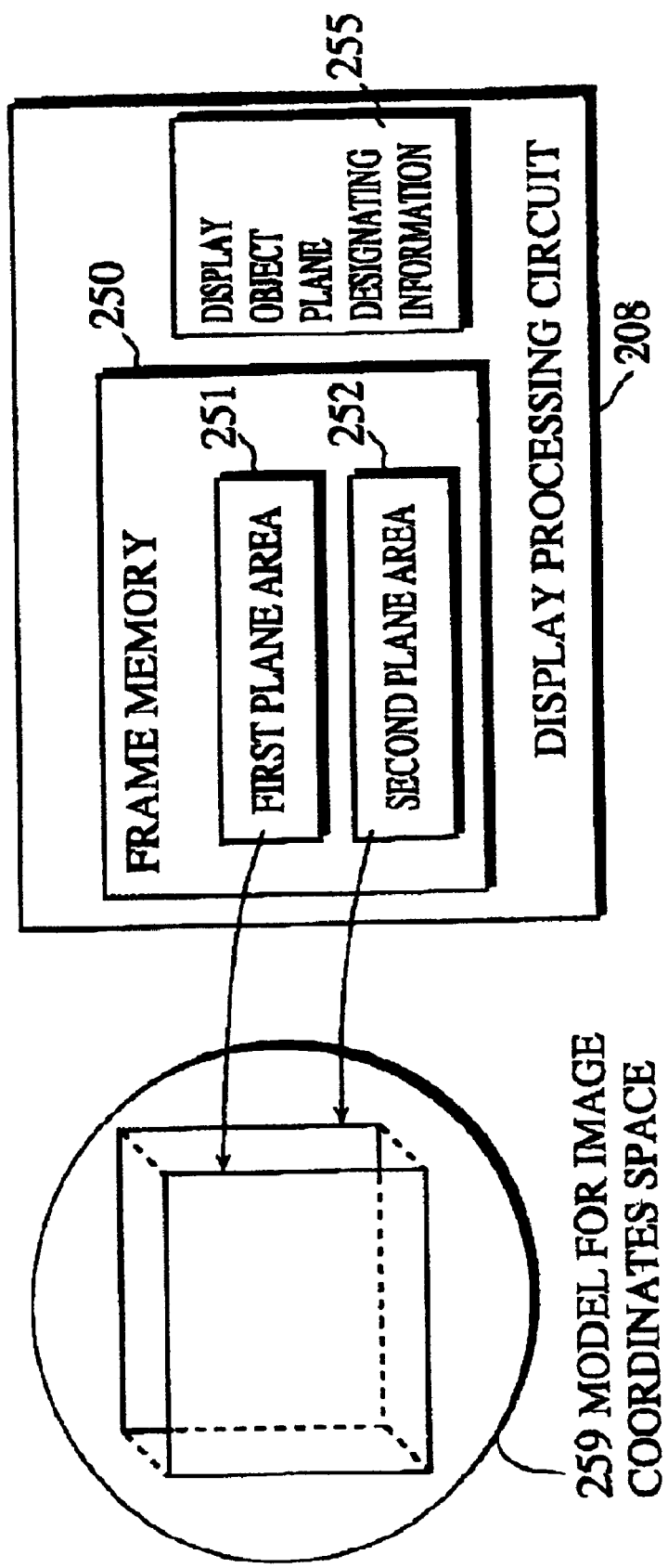
FIG. 19 is a block diagram showing functions of a modified display processing circuit 208 in which a frame memory has two image plane areas.

FIG. 19 is a block diagram showing functions of a modified display processing circuit 208 in which a frame memory has two pairs of image plane areas. The frame memory has two pairs of image plane areas corresponding to the same coordinate system, that is, a first plane area 251 and a second plane area 252. The modified display processing circuit 208 has a memory to store the display object plane designating information 255 to specify one of the image plane areas, and outputs the image signals in accordance with only the image plane area specified by the display object plane designating information 255.

The modified display processing circuit 208 in FIG. 19, when instructed to display the data broadcasting content in the visible or invisible state, unarchives graphics or the like which are the display data in the data broadcasting content as the image in the image plane area which is not designated by the display object plane designating information 255. When instructed to display the content in the invisible state, the display processing circuit 208 does not update the display object plane designating information 255. When instructed to display the content in the visible state, the display processing circuit 208 updates the display object plane designating information 255 so that the image plane area where the graphics or the like are unarchived is specified. When instructed to change from the invisible state to the visible state, the display processing circuit 208 updates the display object plane designating information 255 so that the other plane area is specified, and changes the image plane area to be outputted.

When the modified display processing circuit 208 is used, it is not necessary to instruct the display processing circuit 208 to stop the presentation at the timing when the script execution unit 243 excludes the data broadcasting content as the current object for interpretation from the object for interpretation. This enables, for example, the data broadcasting content C01 to change to the invisible state at the moment when the data broadcasting content C02 changes into the visible state in accordance with the command "LaunchDoc" so as to become visible to the viewer, which leads the data broadcasting contents to change accurately. Therefore, the data broadcasting content corresponding to the current broadcast program can become invisible to the viewer and the data broadcasting content corresponding to the following broadcast program can be presented so that the viewer can recognize it, precisely concurrent with the timing when the audiovisual data changes to the data corresponding to the following broadcast program.

(5) In the both embodiments, one unit of the data broadcasting content corresponds to one broadcast program. However, this unit may include at least one control statement, and material data whose presentation format or the like is designated by the control statement. In addition, a plurality of one unit of the data broadcasting contents may be broadcasted at the same time.

Here, the data broadcasting content may consist of a plurality of material data, such as characters and graphics, and a plurality of control statements. Each of control statements designates the display format or the like for the material data in order to basically form one display screen, and display screens are linked with each other. In addition, it may be configured so that these plurality of material data and plurality of control statements are divided into a plurality of groups, material data and control statements in the same group are regarded as one module, and the data broadcasting content consist of a plurality of modules.

In case that the data broadcasting content is presented at a time "t" according to the control statements in a module A, the transmission apparatus should broadcast the module A bit earlier than the time "t" in addition to a group of modules of the data broadcasting contents, while broadcasting the message with the message ID 02 at "t". Here, the control statements in the data broadcasting content which is formerly broadcasted should include the descriptions corresponding to the <event> tag, <script> tag, and the like so as to, when the message with the message ID 01 is received, receive the module A, store it in the memory, interpret the control statements in the module A, and unarchive the display data in the data broadcasting content into the frame memory. While, the control statements in the module A should include the descriptions corresponding to the <event> tag, <script> tag, and the like so as to, when the message with the message ID 02 is received, change the display data unarchived in the frame memory into the visible state. Here, the receiving apparatus should be configured so as to perform operations according to the descriptions in these control statements.

(6) The both embodiments shows an example where the presentation of the data broadcasting content changes concurrently with the timing when the audiovisual data changes to the following one corresponding to the next program (See FIG. 3). However, the data broadcasting content does not need to change concurrently with the corresponding audiovisual data. Instead, the receiving apparatus may change the data broadcasting content at the timing determined by the program producer or the like during broadcasting the program, with reference to the program procedure.

In addition, it is generally assumed that the timing for changing the presentation of the data broadcasting content, more specifically, the timing when the following data broadcasting content starts to be presented so that the viewer can recognize it, is determined with reference to the audiovisual data. However, this may be not determined with reference to the audiovisual data. Besides, it is assumed that the audiovisual data and the data broadcasting content which are presented at the same time relate to each other in their content. However, they may have no relation to each other.

Moreover, when the data broadcasting content is broadcasted, it is not necessary for audiovisual data to be multiplexed to it. Instead, either visual data or audio data may be broadcasted in addition to the data broadcasting content. Alternatively, neither visual data nor audio data may be broadcasted. That is, the transmission and reception system for data broadcast according to the invention enables the data broadcasting contents to be organized in accordance with the intention of the producer who determines the temporal plan for the data broadcasting contents by allowing the transmission apparatus to broadcast the message at the specific timing so as to control the timing when the receiving apparatus starts to visibly present the data broadcasting content to the viewer.

In addition, presuppose the case when the timing a bit earlier than the timing "t0" when the data broadcasting content changes C02 should be presented in place of C01 can be specified in advance. In this case, the transmission apparatus may omit to broadcast the message with the message ID 01 a bit earlier than the time "t0", and broadcasts the data broadcasting content C01 which includes not the control statements 301 but the control statements 3301 shown in FIG. 20. Here, "<item type= "TimerFired"timevalue="07:12:45" onOccur="func1( )"/>" in the control statements 3301 instructs to execute the command making up the function "func1" at the generation of the timer event where it is 7:12:45. In this case, the receiving apparatus should be configured so as to execute the function in accordance with the generation of the timer event.

Similarly, in case that the time "t0" can be specified in advance, the control statements 302 in the data broadcasting content C02 may be rewritten so as to use the timer event waiting for the time "t0" as the opportunity instead of the message event waiting for the message with the message ID 02 as the opportunity.

Assuming that the receiving apparatus has a function detecting the initiation of broadcast of the specified data broadcasting content, it may be configured so that broadcast of the message with the message ID 01 is omitted, and the description in the control statements 301 or the like shows that the function is executed not when the message with the message ID is received but when the initiation of broadcast of the data broadcasting content C02 is detected.

(7) In the both embodiments, the transmission apparatus broadcasts the message with a message ID a bit earlier than the time "t0" when one unit of data broadcasting content should be visibly presented to the viewer, and broadcasts the message with the different message ID at the time "t0". However, the number of times when message with a message ID is broadcasted is not limited to one time, and the message may be broadcasted continuously a plurality of times. In this case, however, even when the same message is broadcasted continuously a plurality of times, the receiving apparatus should regard that the message event is generated only once, and allow the function stored so as to correspond to the event to be executed only once (8) In the both embodiments, the time in the schedule information or the like (See FIGS. 3–5) is represented by hour, minute, and second. However, the format of the time is optionally selected. Thus, year, month, and date may be added, and shorter time unit than minute may be represented.

In addition, since the descriptions such as tags and commands are just one example, the other descriptions indicating similar contents may be used.

Besides, the message IDs, audiovisual data, management codes, data broadcasting contents managing codes shown in the both embodiments are just one example.

Each of these embodiments shows one example where the data broadcasting contents managing code is indicated as a parameter for each command. However, as far as identification information can specify a data broadcasting content, one module or a control statement in the data broadcasting content, the parameter may consist of any information. In this case, the receiving apparatus should be configured so as to control the reception, interpretation, and presentation of the data broadcasting content in accordance with the indicated identification information.

(9) In the both embodiments, the transmission and reception system transmits and receives satellite digital broadcast. However, this invention is not limited to the satellite broadcast or digital broadcast, but may be applied to the broadcast by ground waves and cable TVs. In addition, the invention also may be applied to the case where the data broadcasting content is transmitted by Vertical Blanking Interval (VBI), which is used for the analog broadcast.

(10) In the both embodiments, the transmission apparatus broadcasts the message with the message ID 02 at the time when one unit of data broadcasting content should start to be presented (i.e., the time when the data broadcasting content should be visibly presented to the viewer). However, considering the time required for the receiving apparatus to receive the message and change the invisible state of the data broadcasting content to the visible state, the message may be broadcasted earlier by such a required time than the estimated time for starting the presentation of the data broadcasting content.

(11) The both embodiments focuses on the aspect where the presentation timing for images such as characters and graphics is precisely controlled. Similarly, the presentation timing for sounds such as sound effects also can be precisely controlled. That is, control statements in the data broadcasting content may be described so that, when the receiving apparatus receives the message with the message ID 01, the data for reproducing the sounds are prepared so as to be promptly reproduced by, for example, decompression or conversion of the format, and they can start to be reproduced when the message with the message ID 02 is received.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A transmission and reception system for data broadcast, including a transmission apparatus which transmits a data broadcasting content and a receiving apparatus which receives and presents the transmitted data broadcasting content, the transmission apparatus comprising:
    a presentation schedule time obtaining means for obtaining a presentation schedule time when the data broadcasting content is to be presented,
    a data broadcasting content transmission means for starting to transmit preceding data broadcasting content and then the data broadcasting content before the presentation schedule time, each of the preceding data broadcasting content and the data broadcasting content being repeatedly transmitted,
    the preceding data broadcasting content including first control information including an instruction which instructs the receiving apparatus to, on reception of an invisible presentation instruction message, start to receive the data broadcasting content and designate the data broadcasting content to be presented,
    the data broadcasting content including image structure information and second control information, the second information including
        (a) an instruction which instructs the receiving apparatus to, when the data broadcasting content is designated to be presented, form an image according to the image structure information and invisibly present the image,
        (b) an instruction which instructs the receiving apparatus to, on reception of a presentation start instruction message, visibly present the image; and
    a message transmission means for (i) transmitting the invisible presentation instruction message at a time when the data broadcasting contents transmission means starts to transmit the data broadcasting content, and (ii) transmitting the presentation start instruction message at the presentation schedule time, and
the receiving apparatus including an event-driven mechanism that executes an instruction corresponding to a received message, comprising:
    a data broadcasting contents reception and presentation means for receiving the preceding data broadcasting content, starting to receive the data broadcasting content on reception of the invisible presentation instruction message, designating the data broadcasting content to be presented on completion of receiving the data broadcasting content, forming the image in accordance with the second control information, and invisibly presenting the image; and
    a data broadcasting contents visualization means for visibly presenting the image which has been invisibly presented by the data broadcasting contents reception and presentation means, on reception of the presentation start instruction message.

2. The transmission and reception system for data broadcast of claim 1, wherein
    to invisibly present the data broadcasting content, the data broadcasting contents reception and presentation means forms the image according to the image structure information, stores the image in a frame memory and prohibits outputting a signal indicating the image, to a display apparatus to which the receiving apparatus is connected, and
    to visibly present the image, the data broadcasting contents visualization means allows output of the signal indicating the image, to the display apparatus.

3. The transmission and reception apparatus for data broadcast of claim 2, wherein
    the preceding data broadcasting content further includes preceding image structure information to form an image that is to be presented,
    the instruction in the first control information instructs the receiving apparatus to, on reception of the invisible presentation instruction message, make the image, which is formed according to the preceding image structure information and visibly presented, invisible, before starting to receive the data broadcasting content and designate the data broadcasting content to be presented, and
    the data broadcasting contents reception and presentation means
        (a) on reception of the preceding data broadcasting content, visibly presents the image formed according to the preceding image structure information, and
        (b) on reception of the invisible presentation instruction message, makes the image, which is formed and visibly presented according to the preceding image structure information, invisible, before starting to receive the data broadcasting content.

4. The transmission and reception system for data broadcast of claim 2, wherein
    the preceding data broadcasting content further includes preceding image structure information in order to form an image that is to be presented,
    the data broadcasting contents reception and presentation means
        (a) includes a memory which has a space where the data broadcasting content and the preceding data broadcasting content can be stored at the same time,
        (b) receives the preceding data broadcasting content, and stores the content in the memory, and then visibly presents the image formed according to the preceding image structure information, and
        (c) on reception of the invisible presentation instruction message, starts to receive and store the data broadcasting content in the memory, and, erases the image visibly presented according to the preceding image structure information, on completion of storing the content in the memory.

5. The transmission and reception system for data broadcast of claim 3, wherein
    the data broadcasting contents transmission means transmits the preceding data broadcasting content and the data broadcasting content which are multiplexed with video stream data, in which (a) visual data making up a first broadcast proaram relevant to the preceding data broadcasting content and (b) visual data making up a second broadcast program relevant to the data broadcasting content are continuously arranged, the presentation schedule time is determined in advance so as to be concurrent with a time when the receiving apparatus is due to start to present the visual data making up the second broadcast program, and the data broadcasting contents reception and presentation means receives the preceding data broadcasting content and the data broadcasting content multiplexed with the video stream data, and presents each of the first and second broadcast programs.

6. The transmission and reception system for data broadcast of claim 1, wherein the data broadcasting contents transmission means transmits the data broadcasting content which is multiplexed with video stream data including visual data making up a broadcast program relevant to the data broadcasting content, the presentation schedule time is determined in advance so as to be concurrent with a time when the receiving apparatus is due to start to present the visual data making up the broadcast program in the video stream data, and the data broadcasting contents reception and presentation means receives the data broadcasting content multiplexed with the video stream data, and presents the broadcast program.

7. A transmission and reception method for data broadcast used in a system including a transmission apparatus which transmits a data broadcasting content and a receiving apparatus which receives and presents the transmitted data broadcasting content comprising:

a presentation schedule time obtaining step for obtaining a presentation schedule time when the data broadcasting content is to be presented, the obtaining step being performed at the transmission apparatus a data broadcasting content transmission step for starting to transmit preceding data broadcasting content; and then the data broadcasting content before the presentation schedule time, each of the preceding data broadcasting content and the data broadcasting content being repeatedly transmitted, the content transmission step being performed at the transmission apparatus, the preceding data broadcasting content including first control information including an instruction which instructs the receiving apparatus to, on reception of an invisible presentation instruction message, start to receive the data broadcasting content and designate the data broadcasting content to be presented, the data broadcasting content including image structure information and second control information, the second information including (a) an instruction which instructs the receiving apparatus to, when the data broadcasting content is designated to be presented, form an image according to the image structure information and invisibly present the image, (b) an instruction which instructs the receiving apparatus to, on reception of a presentation start instruction message, visibly present the image; and a message transmission step for (i) transmitting the invisible presentation instruction message at a time when the transmission apparatus starts to transmit the data broadcasting content in the data broadcasting content transmission step, and (ii) transmitting the presentation start instruction message at the presentation schedule time, the message transmission sten being performed at the transmission apparatus;

a data broadcasting contents reception and presentation step for receiving the preceding data broadcasting content, starting to receive the data broadcasting content on reception of the invisible presentation instruction message, designating the data broadcasting content to be presented on completion of receiving the data broadcasting content, forming the image in accordance with the second control information, and invisibly presenting the image, the reception and presentation step being performed at the receiving apparatus; and a data broadcasting contents visualization step for visibly present the image which has been invisibly presented in the data broadcasting contents reception and presentation step, on reception of the presentation start instruction message.

8. A transmission apparatus which transmits a data broadcasting content to a receiving apparatus which receives and presents the data broadcasting content, comprising:

a presentation schedule time obtaining means for obtaining a presentation schedule time when the data broadcasting content is to be presented;

a data broadcasting content transmission means for starting to transmit preceding data broadcasting content and then the data broadcasting content before the presentation schedule time, each of the preceding data broadcasting content and the data broadcasting content being repeatedly transmitted, the preceding data broadcasting content including first control information including an instruction which instructs the receiving apparatus to, on reception of an invisible presentation instruction message, start to receive the data broadcasting content and designate the data broadcasting content to be presented, the data broadcasting content including image structure information and second control information, the second information including (a) an instruction which instructs the receiving apparatus to, when the data broadcasting content is designated to be presented form an image according to the image structure information and invisibly present the image, and (b) an instruction which instructs the receiving apparatus to, on reception of a presentation start instruction message visibly present the image; and a message transmission means for (i) transmitting the invisible presentation instruction message at a time when the data broadcasting contents transmission means starts to transmit the data broadcasting content, and (ii) transmitting the presentation start instruction message at the presentation schedule time.

9. The transmission apparatus of claim 8, wherein the data broadcasting contents transmission means transmits the preceding data broadcasting content and the data broadcasting content which are multiplexed with video stream data, in which (a) visual data making up a first broadcast program relevant to the preceding data broadcasting content and (b) visual data making up a second broadcast program relevant to the data broadcasting content are continuously arranged, and the presentation schedule time is determined in advance so as to be concurrent with a time when the receiving apparatus is due to start to present the visual data making up the second broadcast program.

10. A control program for enabling a transmission apparatus to perform a content transmission process in which the transmission apparatus transmits a data broadcasting content to a receiving apparatus which receives and presents the data broadcasting content, the content transmission process comprising:

a presentation schedule time obtaining step for obtaining a presentation schedule time when the data broadcasting content is to be presented;

a data broadcasting content transmission step for starting to transmit preceding data broadcasting content and then the data broadcasting content before the presentation schedule time, each of the preceding data broadcasting content and the data broadcasting content being repeatedly transmitted, the preceding data broadcasting content including first control information including an instruction which instructs the receiving apparatus to, on reception of an invisible presentation instruction message, start to receive the data broadcasting content and designate the data broadcasting content to be presented, the data broadcasting content including image structure information and second control information, the second inforniation including (a) an instruction which instructs the receiving apparatus to, when the data broadcasting content is designated to be presented, form an image according to the image structure information and invisibly present the image, and (b) an instruction which instructs the receiving apparatus to, on reception of a presentation start instruction message, visibly present the image; and a message transmission step for (i) transmitting the invisible presentation instruction message at a time when the data broadcasting content starts to be transmitted in the data broadcasting contents transmission step, and (ii) transmitting the presentation start instruction message at the presentation schedule time.

* * * * *

UNITED STATES PATENT AND TRADEMARK OFFICE
CERTIFICATE OF CORRECTION

PATENT NO. : 6,954,795 B2  Page 1 of 1
DATED : October 11, 2005
INVENTOR(S) : Takao et al.

It is certified that error appears in the above-identified patent and that said Letters Patent is hereby corrected as shown below:

<u>Column 28,</u>
Line 55, before "stores", "and" should be deleted.
Line 60, delete "and," and insert -- and --.
Line 65, delete "claim 3" and insert -- claim 1 --.

<u>Column 29,</u>
Lines 26-27, delete "in the video stream data".

<u>Column 30,</u>
Line 17, delete "present" and insert -- presenting --.
Line 45, delete "presented" and insert -- presented, --.

Signed and Sealed this

Twenty-fifth Day of April, 2006

JON W. DUDAS
*Director of the United States Patent and Trademark Office*